(12) United States Patent
Guttinger et al.

(10) Patent No.: US 7,587,879 B2
(45) Date of Patent: Sep. 15, 2009

(54) SYSTEM AND METHOD FOR TOP LOADING OF ITEMS INTO RECEPTACLES

(75) Inventors: Peter Guttinger, Milton (CA); André A. Weclawski, Etobicoke (CA); Petar Baclija, Etobicoke (CA)

(73) Assignee: Langen Packaging Inc., Ontario (CA)

( * ) Notice: Subject to any disclaimer, the term of this patent is extended or adjusted under 35 U.S.C. 154(b) by 0 days.

(21) Appl. No.: 11/129,391

(22) Filed: May 16, 2005

(65) Prior Publication Data

US 2006/0254221 A1    Nov. 16, 2006

(51) Int. Cl.
B65B 1/04    (2006.01)
B65B 5/08    (2006.01)

(52) U.S. Cl. ............................. 53/251; 53/248; 53/255; 53/169

(58) Field of Classification Search ............... 53/246, 53/248, 249, 250, 251, 255, 158, 169, 446, 53/475
See application file for complete search history.

(56) References Cited

U.S. PATENT DOCUMENTS

| | | | | | |
|---|---|---|---|---|---|
| 2,699,278 | A | * | 1/1955 | Wysocki | 53/534 |
| 3,393,495 | A | * | 7/1968 | Hillman et al. | 53/246 |
| 3,500,612 | A | * | 3/1970 | Hall | 53/246 |
| 3,553,927 | A | * | 1/1971 | Anglade | 53/448 |
| 4,429,512 | A | | 2/1984 | Pegon, Jr. | |
| 4,608,808 | A | | 9/1986 | Ryan et al. | |
| 4,731,975 | A | * | 3/1988 | Rossier | 53/148 |
| 4,750,315 | A | | 6/1988 | Wadell | |
| 4,896,474 | A | | 1/1990 | Osteen et al. | |
| 5,197,261 | A | * | 3/1993 | Hartness et al. | 53/534 |
| 5,491,959 | A | | 2/1996 | Jenne | |
| 5,551,214 | A | | 9/1996 | Vincze et al. | |
| 5,564,262 | A | | 10/1996 | Bevis et al. | |
| 6,050,420 | A | | 4/2000 | Green | |
| 6,152,305 | A | | 11/2000 | Green | |
| 6,427,842 | B1 | | 8/2002 | Green | |
| 6,694,706 | B1 | | 2/2004 | Odenthal et al. | |
| 7,137,234 | B2 | * | 11/2006 | Caporali et al. | 53/433 |

OTHER PUBLICATIONS http://www.flexlink.com/wps.public/s/1000/c/13717.
http://www.flexlink.com/wps.public/s/10000/c/385689.
http://www.amtectechnologies.com/flexlinkconveyors.htm.

* cited by examiner

*Primary Examiner*—Paul R Durand
(74) *Attorney, Agent, or Firm*—Antonelli, Terry, Stout & Kraus, LLP.

(57) ABSTRACT

A system for loading a plurality of items in series into a receptacle held in an item holding device, comprises a plurality of item holding devices each adapted for holding an item receptacle adapted to hold a plurality of items. A holding devices moving apparatus such as a conveyor, moves the plurality of item holding devices through an item loading station with the item receptacles being oriented at a first angle to the horozinal. An item delivery apparatus delivers a plurality of items separately in series at an item orientation that is at a second angle to the item receptacles. The item delivery apparatus may include a metering device comprising a wheel member having a plurality of generally radially extending, generally equally spaced finger members, with all adjacent finger members being configured at a distance there between proximate end portions of said adjacent finger members. The radial position of the fingers, and thus the distance between end portions, is adjustable.

36 Claims, 23 Drawing Sheets

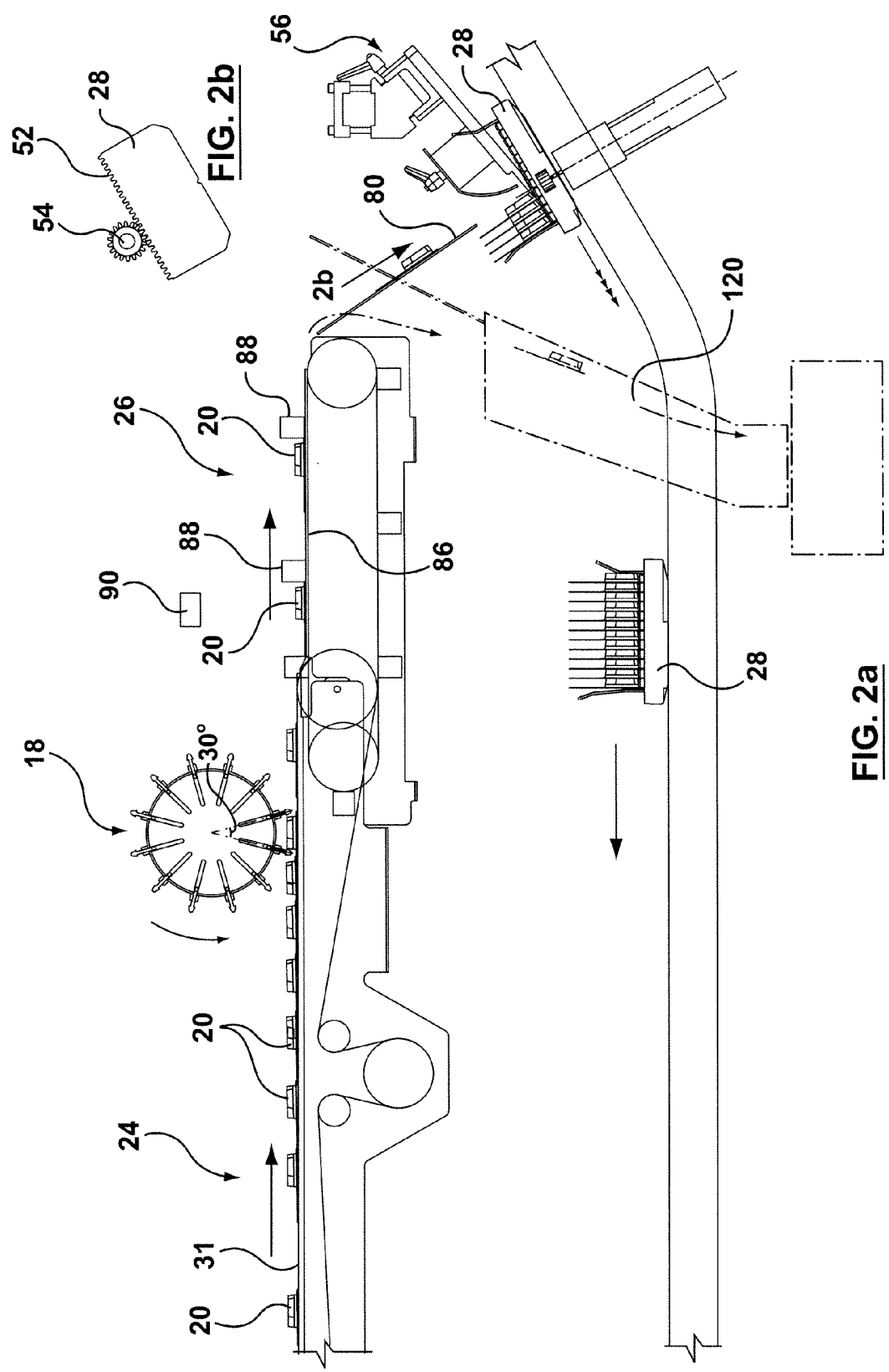

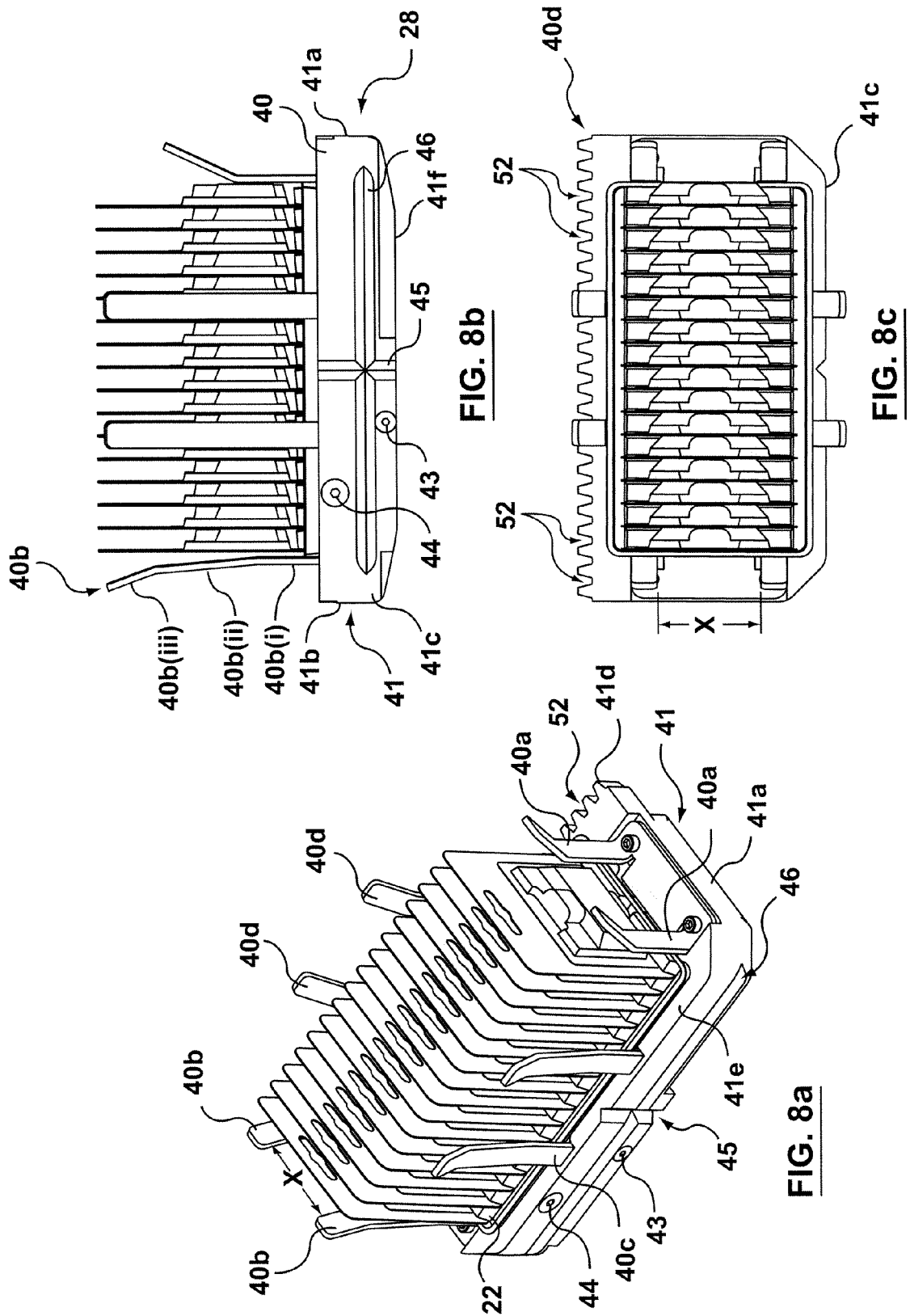

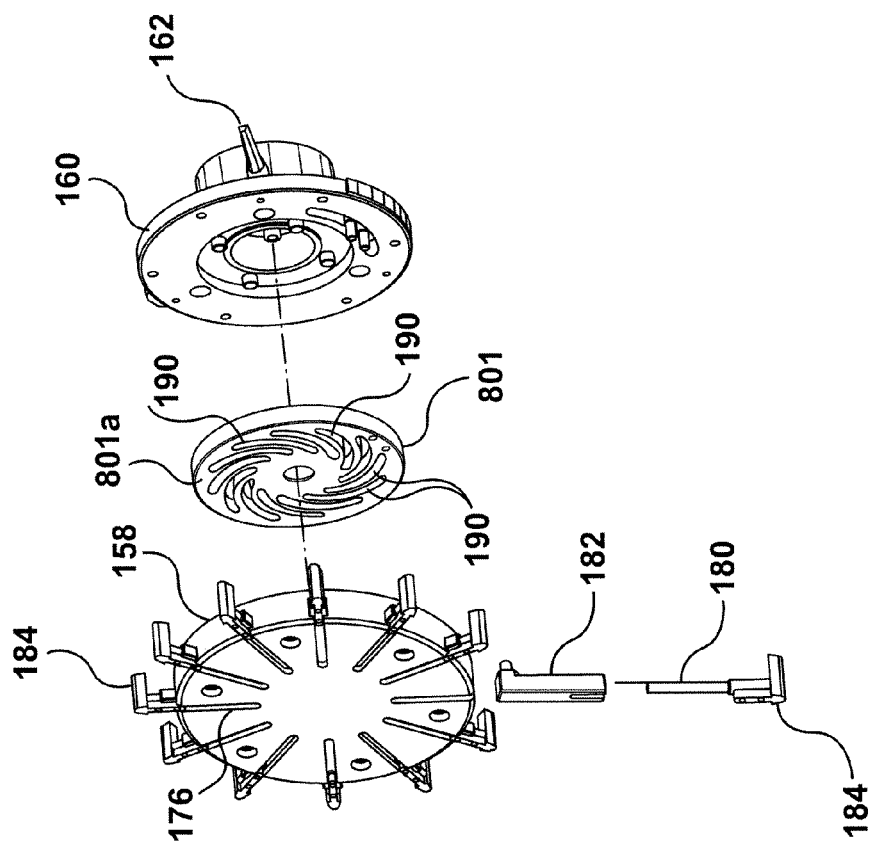
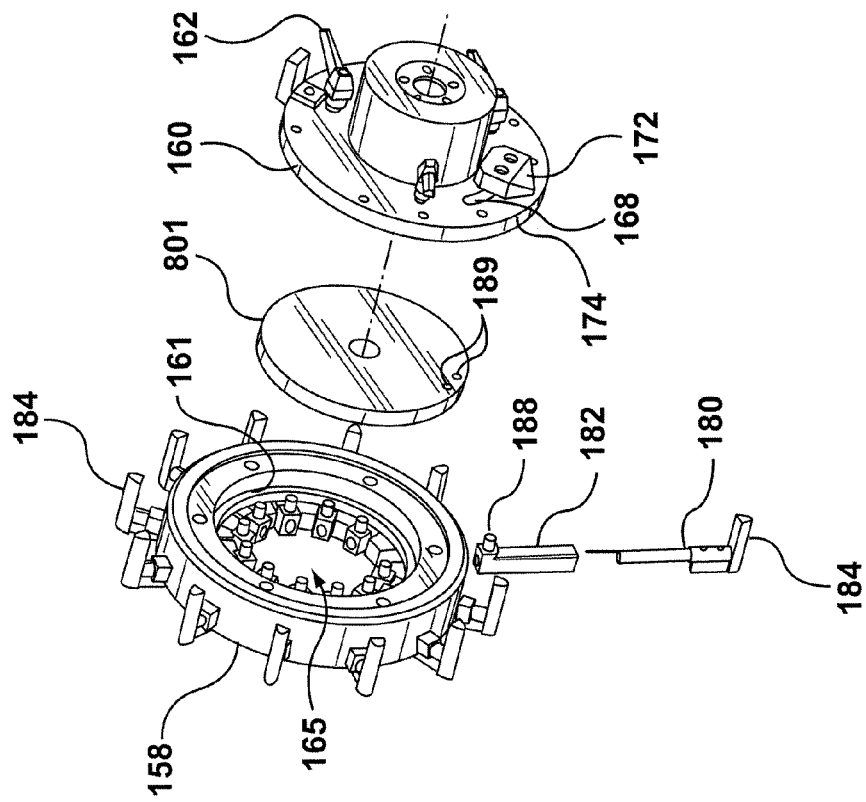

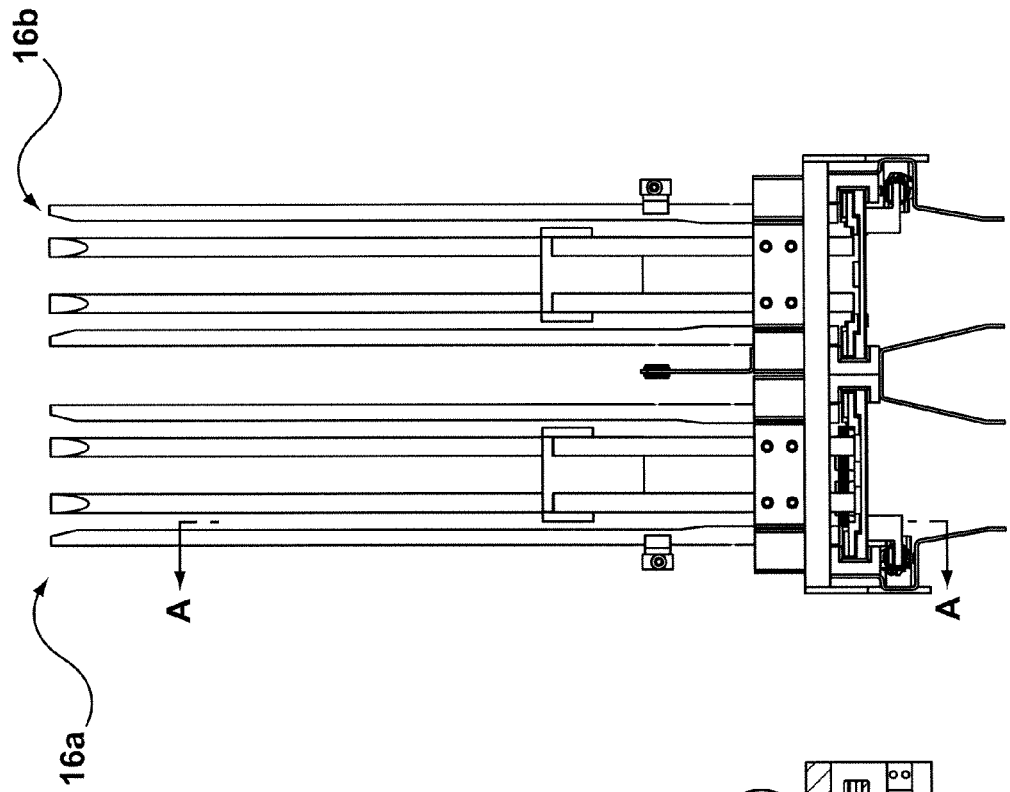
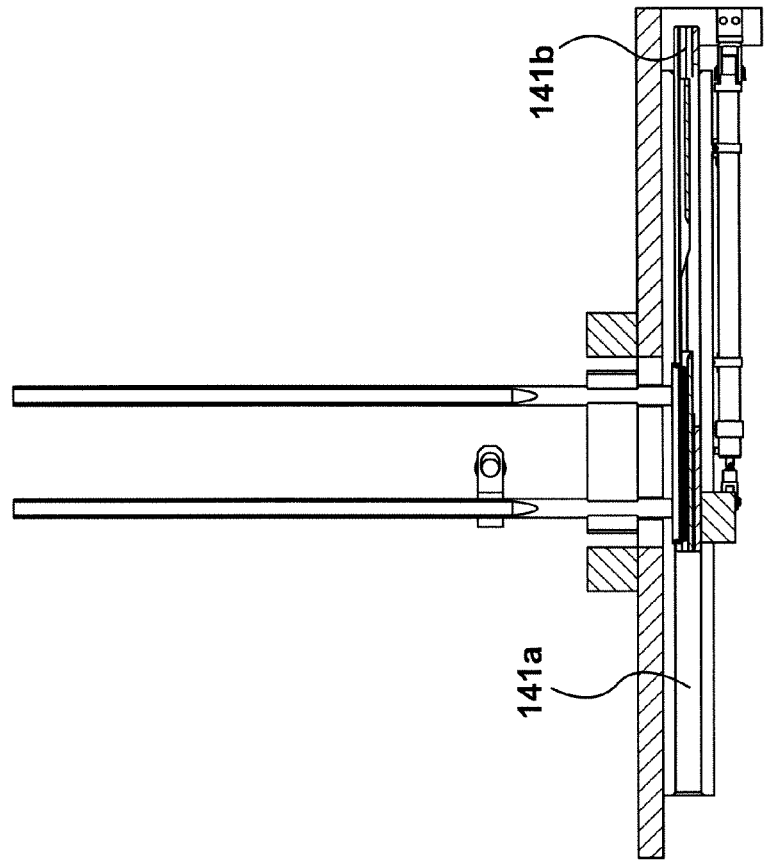
FIG. 15b
FIG. 15a

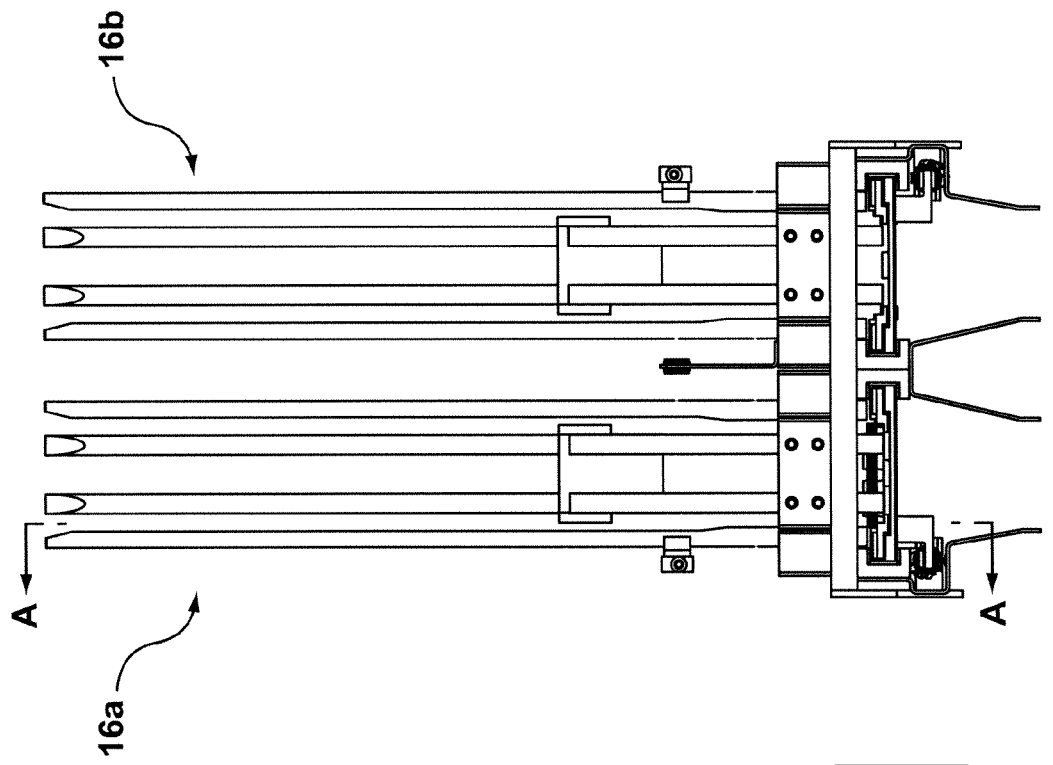
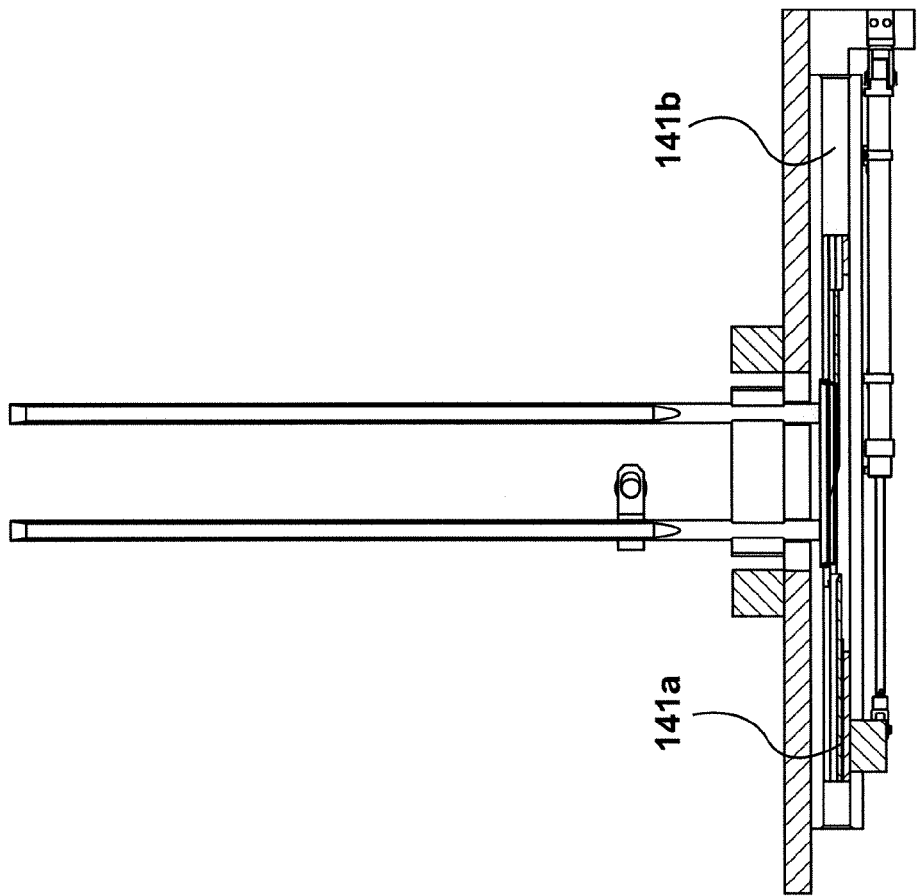
FIG. 17b
FIG. 17a

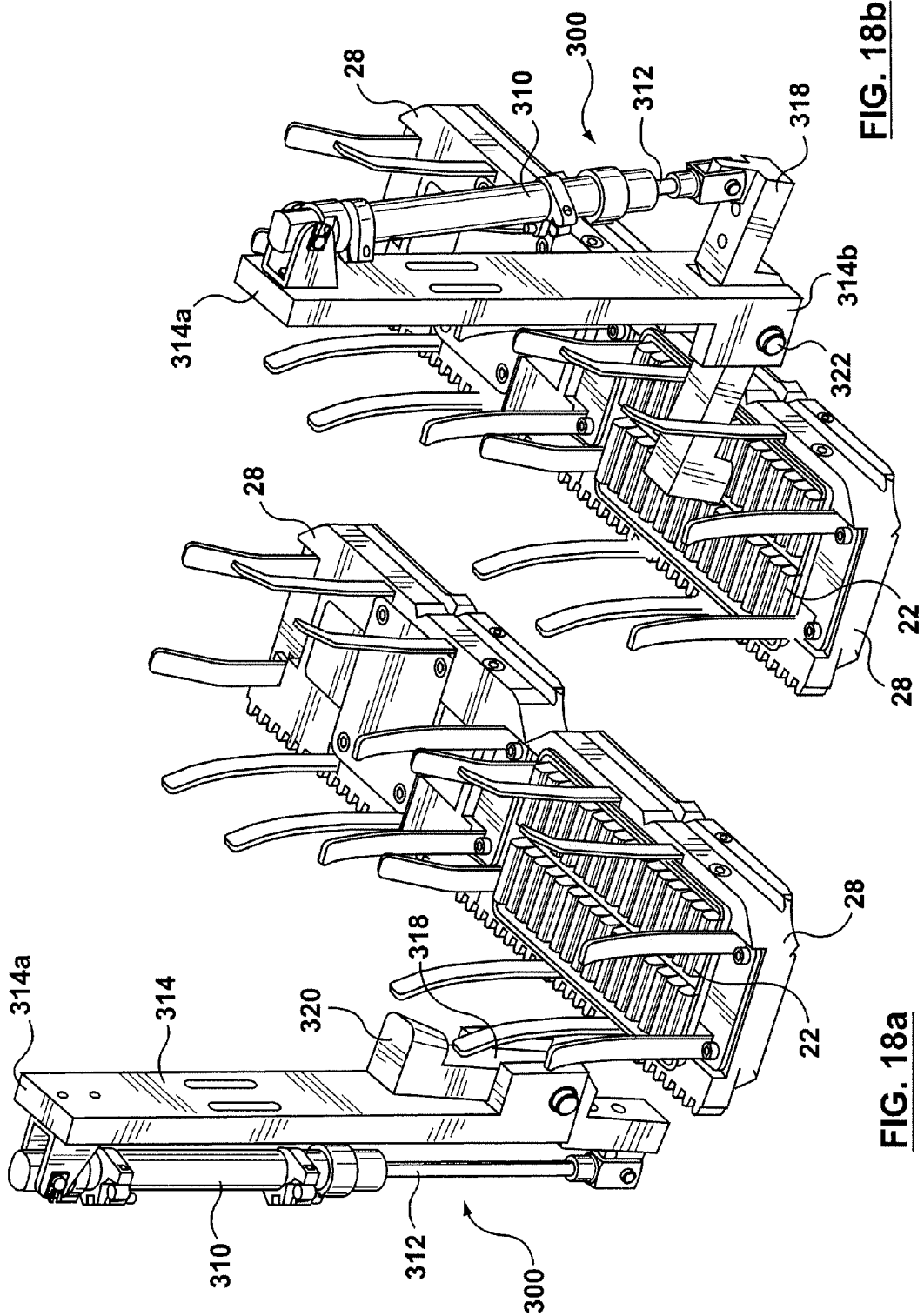

SYSTEM AND METHOD FOR TOP LOADING OF ITEMS INTO RECEPTACLES

FIELD OF THE INVENTION

The present invention relates to a system and method for top loading of items into receptacles including holding devices. The invention may be employed for loading blister pack items, which may contain consumables such as batteries into receptacles. The receptacles may for example be trays with slots for holding a plurality of blister packs.

BACKGROUND

There are known systems for the top loading of several items into product containers or receptacles. Some of these systems employ conveyors, where products to be loaded are transferred from a product conveyor into containers carried by a container conveyor. While in some systems, products can be transferred laterally from a product conveyor into a container carried by a container conveyor, for many products and product containers it is desirable or necessary to instead top load the products into the containers.

While there are known systems and methods for top loading products, including multiple products, into a series of containers/receptacles, they suffer from drawbacks.

One particular application that is problematic is the loading a plurality of blister packaged items into receptacles. Some blister packs have a lower edge portion that must be received into a corresponding transverse slot in the receptacle. The receptacles can be configured to provide a display stand that a retailer can use to display the items for sale in a store or the like.

In view of the foregoing an improved method and system for top loading of items into holding devices is desired.

SUMMARY OF THE INVENTION

According to one aspect of the invention there is provided a system for loading a plurality of items in series into a receptacle held in an item holding device, comprising a plurality of item holding devices each adapted for holding an item receptacle adapted to receive and hold a plurality of items; a holding device moving apparatus for moving the plurality of item holding devices to and through an item loading station with the item receptacles being oriented at a first angle to the horizontal; an item delivery apparatus delivering to an item loading station, a plurality of items separately in series at an item orientation that is at a second angle to the item receptacles when each receptacle is at the item loading station, the item delivery apparatus directing items towards each receptacle in turn held in a holding device at the item orientation; wherein each item of the plurality of items is delivered in series by the item delivery apparatus towards each receptacle held in a holding device, and each holding device is moved through the item loading station to permit a plurality of items to be loaded into each the receptacle.

According to another aspect of the invention there is provided a system for delivering a plurality of items comprising an input apparatus, a wheel member and an output apparatus, the wheel member having a plurality of generally radially extending, generally equally spaced, finger members, with all adjacent finger members being configured at a distance there between proximate end portions of the adjacent finger members, for holding at least one item there between.

According to another aspect of the invention there is provided a system for loading a plurality of items in series into an item holding device, comprising: a plurality of item holding devices each adapted for holding an item receptacle adapted to receive and hold at least one item; a holding device moving apparatus for moving the plurality of item holding devices to and through an item loading station with the item receptacles; an item delivery apparatus delivering a plurality of items to the item loading station, the item delivery apparatus directing items towards the item holding device; an energy absorption member, positioned to be impacted by the items discharged toward the item holding device positioned at the item loading station; wherein each item is delivered by the item delivery apparatus toward the holding device in such a manner that it impacts the energy absorption member which assists in loading the receptacle with the item.

According to another aspect of the invention there is provided a system for loading a plurality of items in series into an item holding device, comprising: a plurality of item holding devices each adapted for holding an item receptacle adapted to receive and hold at least one item; a holding device moving apparatus for moving the plurality of item holding devices to and through an item loading station with the item receptacles; an item delivery apparatus delivering a plurality of items in series to the item loading station, the item delivery apparatus directing items towards an item holding device located at the loading station; a resilient spring member, the spring member movable from (a) a resting position to (b) a displaced position when impacted by an item discharged by the item delivery apparatus toward the item holding device to (c) a item loading position wherein the spring moves the item to a position where it can be more readily be received by the item holding device; wherein each item is delivered by the item delivery apparatus toward the holding device in such a manner that it impacts the spring member which assists in loading the receptacle with the item.

According to another aspect of the invention there is provided a method for loading a plurality of items in series into an item holding device, comprising: moving a plurality of item holding devices each adapted for holding an item receptacle adapted to receive and hold a plurality of items thorough an item loading station with intermittent movement, the item receptacle being oriented at a first angle to the horizontal; delivering a plurality of items separately in series at an item orientation that is at a second angle to the item receptacles at the item loading station; wherein each item of the plurality of items is delivered in series by the item delivery apparatus into the receptacle at the orientation, and the holding device is moved through the item loading station to permit the plurality of items to be loaded into the item holding device.

BRIEF DESCRIPTION OF THE DRAWINGS

In Figures which illustrate by way of example only, embodiments of the present invention:

FIGS. 2 and 2a are schematic side elevation view of part of system of FIG. 1;

FIG. 2b is a schematic plan view in direction 2b shown in FIG. 2a;

FIG. 3 is a side elevation view of part of the system of FIG. 1, similar to the views of FIGS. 2 and 2a;

FIG. 8a is a schematic, top perspective view of a puck device holding a receptacle loaded with several battery packs, that can be employed in the system of FIG. 1;

FIG. 8b is a top view of the puck device of FIG. 8a;

FIG. 8c is a side elevation view of the puck device of FIG. 8a;

FIG. 13a is a rear exploded perspective view of the metering device of FIG. 10;

FIG. 13b is a rear exploded perspective view of the metering device of FIG. 10;

FIGS. 15a and 15b are front elevation and side elevation views respectively of the part of FIGS. 14a and 14b, shown in the first of three sequential operational positions;

FIGS. 17a and 17b are front elevation and side elevation views respectively of the part of FIG. 14, shown in the third of three sequential positions;

FIGS. 18a and 18b are perspective views of an item receptacle placement checking mechanism in both operational and non-operational positions.

DETAILED DESCRIPTION

Figure 1:
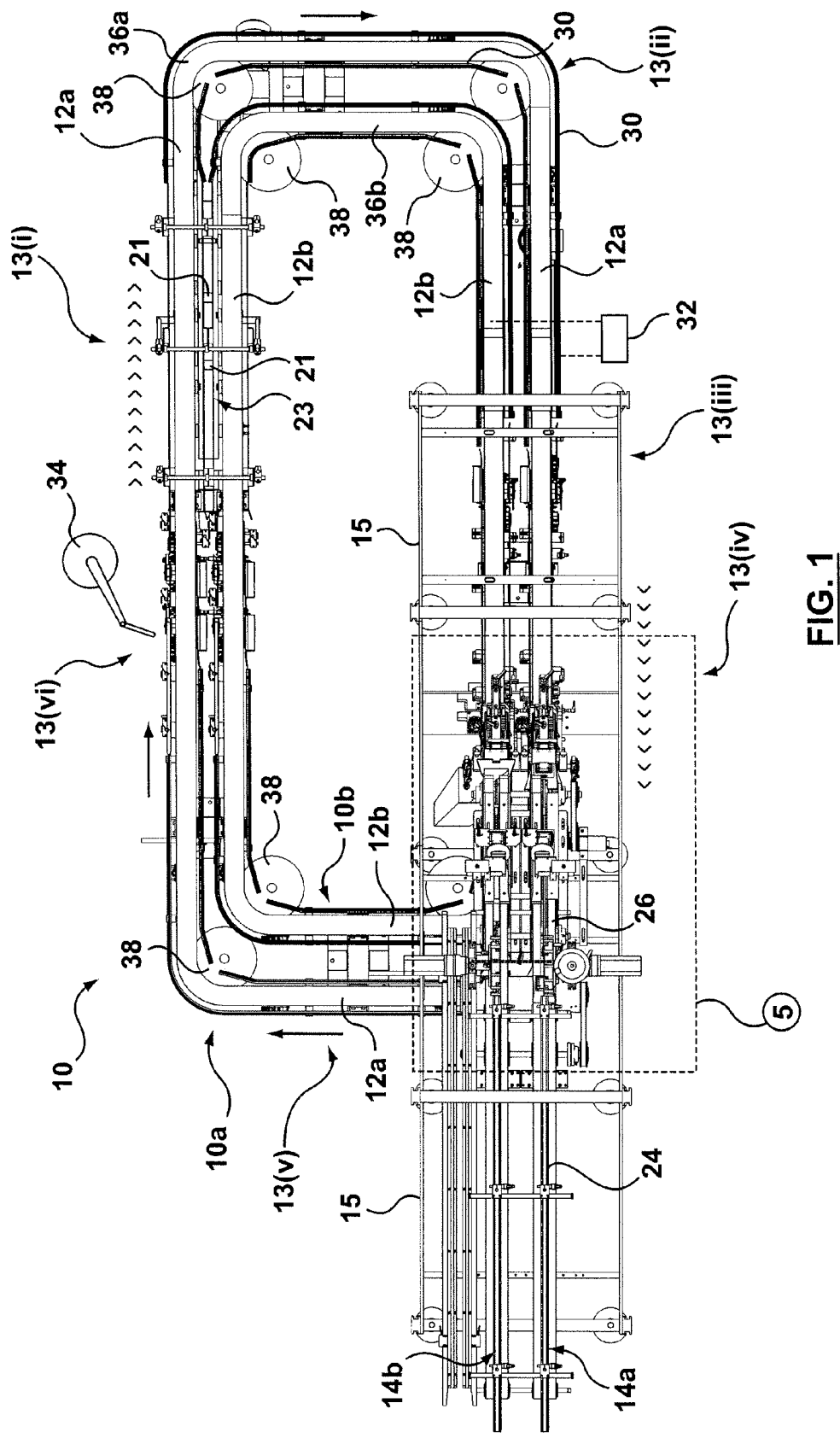
FIG. 1 is a plan view of a system in accordance with an example embodiment of the present invention.

As shown in FIG. 1, a system 11 for the top loading of items 20 into holding devices containing item receptacles 22 comprises two sub-systems 10a, 10b, each including several components. Items 20 may be numerous different types of items. However, the present system 11 described herein is particularly configured for loading so-called blister packages containing a plurality of batteries in a blister type plastic and cardboard package, as shown in detail FIG. 7. Items 20 have a blister portion 20a which can be a plastic material, often transparent or semi-transparent, that holds a plurality of batteries or some other product to a cardboard backing portion.

The item 20 can also have an upper section 20c and a lower portion 20b. The lower portion 20b is configured to fit into a slot 22a of a receptacle 22. The receptacle 22 can be formed with a corrugated upper surface contour with slots 22a formed thereon. Surrounding the perimeter of the receptacle 22 is a lip 22e (see FIG. 7). Receptacle 22 can be made from a material such as a plastic like a thermoplastic polyurethane elastomer and slots 22a can be configured such that they are resiliently displaced when a lower portion 20b of an item 20 is received therein. In this way, the items 20 can be held upright in the receptacle 22. Receptacle loaded with a plurality of items 20 can be used for display purposes in a retail environment. However, in other embodiments, other item holding devices 22 could be employed, such as some types of trays, cartons or other containers.

The sub-systems 10a and 10b can, as shown in FIG. 1, be generally arranged in side by side relationship, and each is independently capable, on a continuous basis, of top loading a plurality of items 20 into successive item receptacles held in a plurality of item holding devices 28. The operation of both sub-systems 10a, 10b can be controlled by a common Programmable Logic Controller (PLC) 32. PLC 32 may be an Allen Bradley model SLC 504 controller.

Each sub-system 10a, 10b includes an item holding device conveyor, 12a, 12b, and a corresponding item delivery conveyor 14a, 14b. Item holding device conveyor 12a functions with item delivery device conveyor 14a, in the same way as item holding device conveyor 12b functions with item delivery conveyor 14b, as described hereafter. System 10 employs two sub-systems 10a and 10b to increase the item loading capacity of system 11. Only one such sub-system could be employed, or more than two could be employed depending upon the particular operational requirements. Hereinafter, only one of the sub-systems (hereinafter referred to generically as sub-system 10) is described with reference to an item holding device conveyor 12, an item delivery conveyor 14 and other components.

Figure 2:
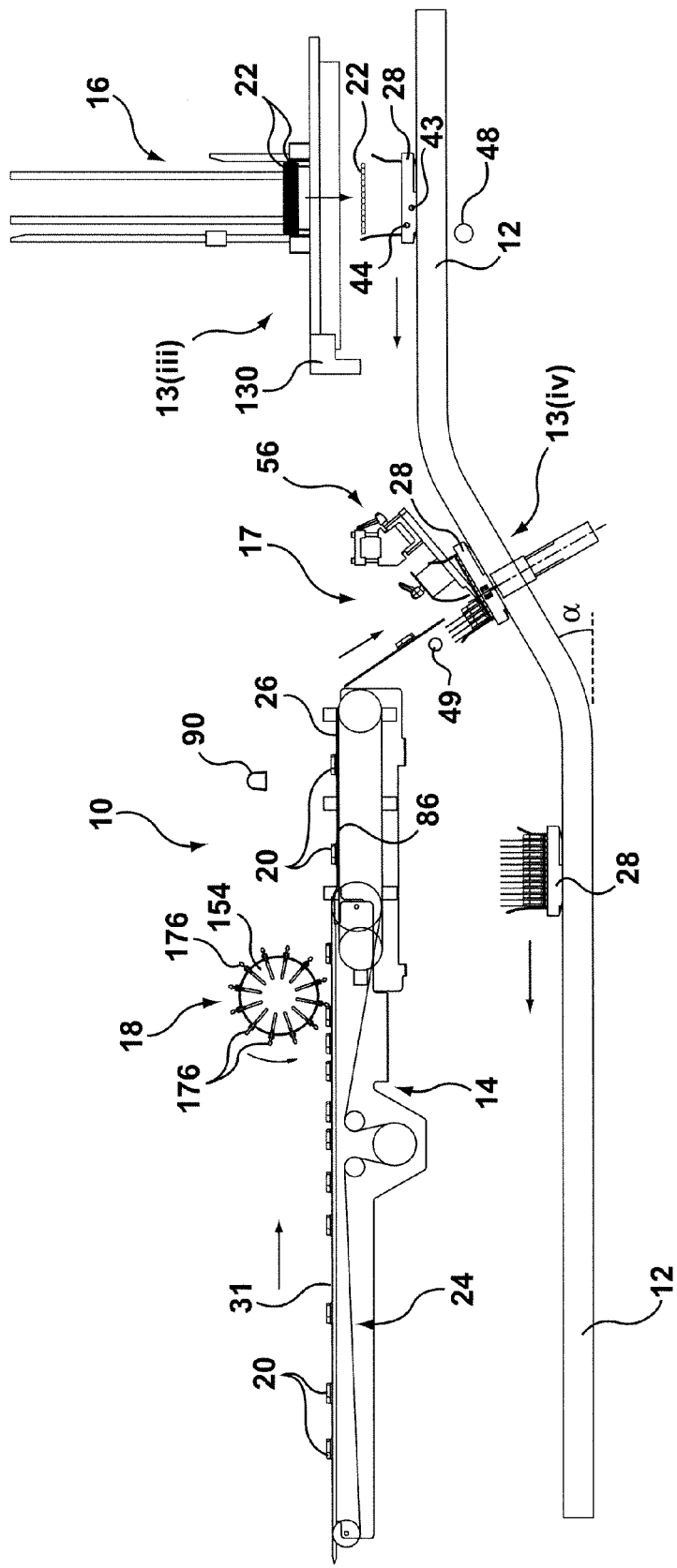

As shown in FIGS. 1 and 2, a sub-system 10 includes item holding device conveyor 12 and item delivery conveyor 14 are mounted to a frame generally designated 15. The system can also include an item unloading device 34 (FIG. 1) which can be a robot device such as a FANUC model M420i with a robot arm having an end effector configured to pick up items 20 being held in holding devices 28 carried on the item holding device conveyor 12. It should be noted that in the illustrated system, a single robot device 34 can be provided which is capable of unloading item holding devices loaded with items 20, from both conveyor 12a and conveyor 12b.

Item holding device conveyor 12 consists of an endless, upward facing conveyor belt 36 which can be driven continuously around a conveyor path 13. Sub-system 10 also includes a plurality of item holding devices 28, which can be, as will be described later, a plurality of puck devices 28. Pucks 28 are generally carried around the conveyor path 13 by the conveyor belt 36. As will be evident from FIG. 1, in plan view the general shape of the conveyor path 13 is rectangular, and has curved portions at its corners. Belt 36 can be formed as a flexible conveyor belt, which enables belt 36 to negotiate the corners of the generally rectangular path 13. The conveyor path 13 does not, however, have to be generally rectangular in shape, in plan view. The conveyor 12 can generally be formed on an aluminum-extruded beam construction, with low friction slide rails guiding a plastic multi-flexing belt 36. Flexible link conveyor systems suitable for deployment as conveyor system 12 include the Flex Link conveyors made by SKF or FlexLink AB.

Figure 3:
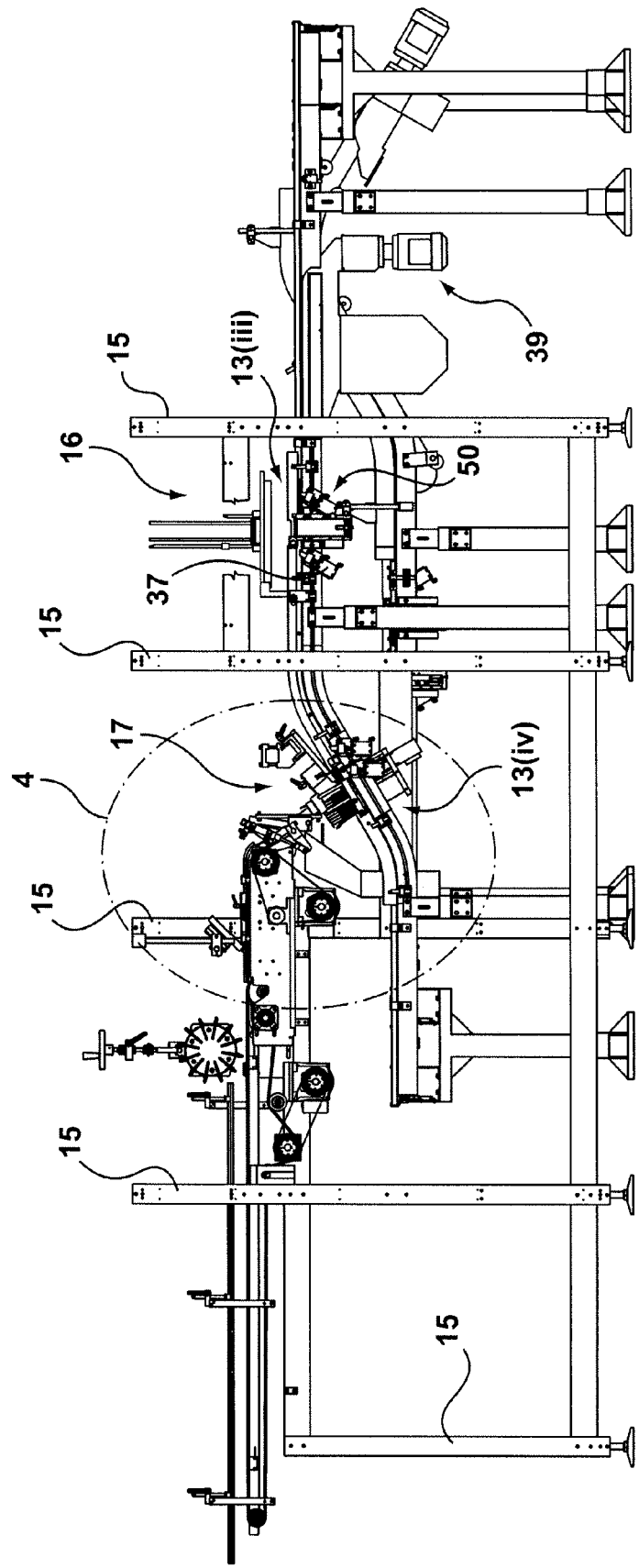

Belt 36 has an upper surface that co-operates with the underneath/lower surface 41(*f*) of base portions 41 (See FIG. 8*b*) of pucks 28, to provide sufficient frictional engagement between the belt and the base 41 of the puck members 28. The puck members 28 then sit freely on top of belt 36. Due to the frictional engagement between belt and puck 28, the pucks 28 move along the generally horizontal portions of the conveyor path 13 driven by the belt 36. The belt 36 is supported in part, and guided by horizontally disposed idler wheels 38, which in the illustrated embodiment are disposed at each of the four corners, of the generally rectangular conveyor path 13. The idler wheels 38 have an upward facing surface, which frictionally engages the underside of belt 36 and so will rotate with the movement of belt 36. The Belt 36 has a cross section shaped like a horizontal H so idler wheels 38 fit in between the top horizontal and the bottom horizontal portion. The belt 36 is driven around the conveyor path by a conveyor drive 39 (see FIG. 3), which can also be provided as part of the conveyor system package provided by a supplier such as SKF or Flex-Link AB.

As puck members 28 are driven in series around the conveyor path by belt 36, they will be guided along this path by a series of upstanding guide rails 30, which can also be formed from extruded aluminum and which engage the side surfaces 41(*c*) of the bases 41 of the pucks 28.

The conveyor path 13 followed by each of the pucks 28 can be can be considered to commence at a generally upwardly sloped ramp portion 13(*i*) followed by a generally horizontal upper section 13(*ii*), which in turn leads to an item receptacle loading station 13(*iii*) portion. After the item receptacle loading station 13(*iii*) the puck move along the conveyor path to a downwardly sloped ramp portion 13(*iv*) that includes an item loading station 17 (FIG. 2). After moving from the downward ramp portion 13(*iv*) the pucks 28 travel along a generally horizontal lower section 13(*v*) to an item unloading station 13(*vi*). After item unloading station, the pucks then move again to upwardly sloped ramp portion 13(*i*) and repeat thereafter repeat the path.

Some further features of the movement of pucks 28 by belt 36 are as follows. During the upwardly sloped ramp portion 13(*i*) of the conveyor path 13, the frictional engagement of the upper side of belt 36 against the underside of puck 28, may not be sufficient to ensure reliable movement up the upwardly sloped ramp. Therefore, to assist in the movement of pucks 28 up ramp portion 13(*i*), as shown in FIG. 1, an additional lug conveyor (designated 23) can be disposed adjacent to item holding device conveyor 12 in the region of ramp portion 13(*i*). Lugs 21 carried by a conveyor belt on this lug conveyor 23 can engage a part of each puck 28 (e.g. such as a rear face 41(*b*) (See FIG. 8*b*) and also be driven at approximately the same speed (or faster) as item holding device conveyor 12 to help push the pucks 28 up the ramp portion 13(*i*).

Conveyor 23 can use a Flexlink belt and a conveyor drive, such as for example is also manufactured by SKF or FlexLink AB, and which is similar to the conveyor 12. However, conveyor 23 is provided with upstanding spaced lugs 21 for engaging a rear portion of a rear face of pucks 28. It should be noted that lug conveyor 23 could be disposed between the belts 36 of both sub-systems 10 and 10*b*, and be configured and employed to assist in moving pucks 28 up adjacent conveyor belts 36 of sub-system 10*a* and sub-system 10*b*.

Figure 19:
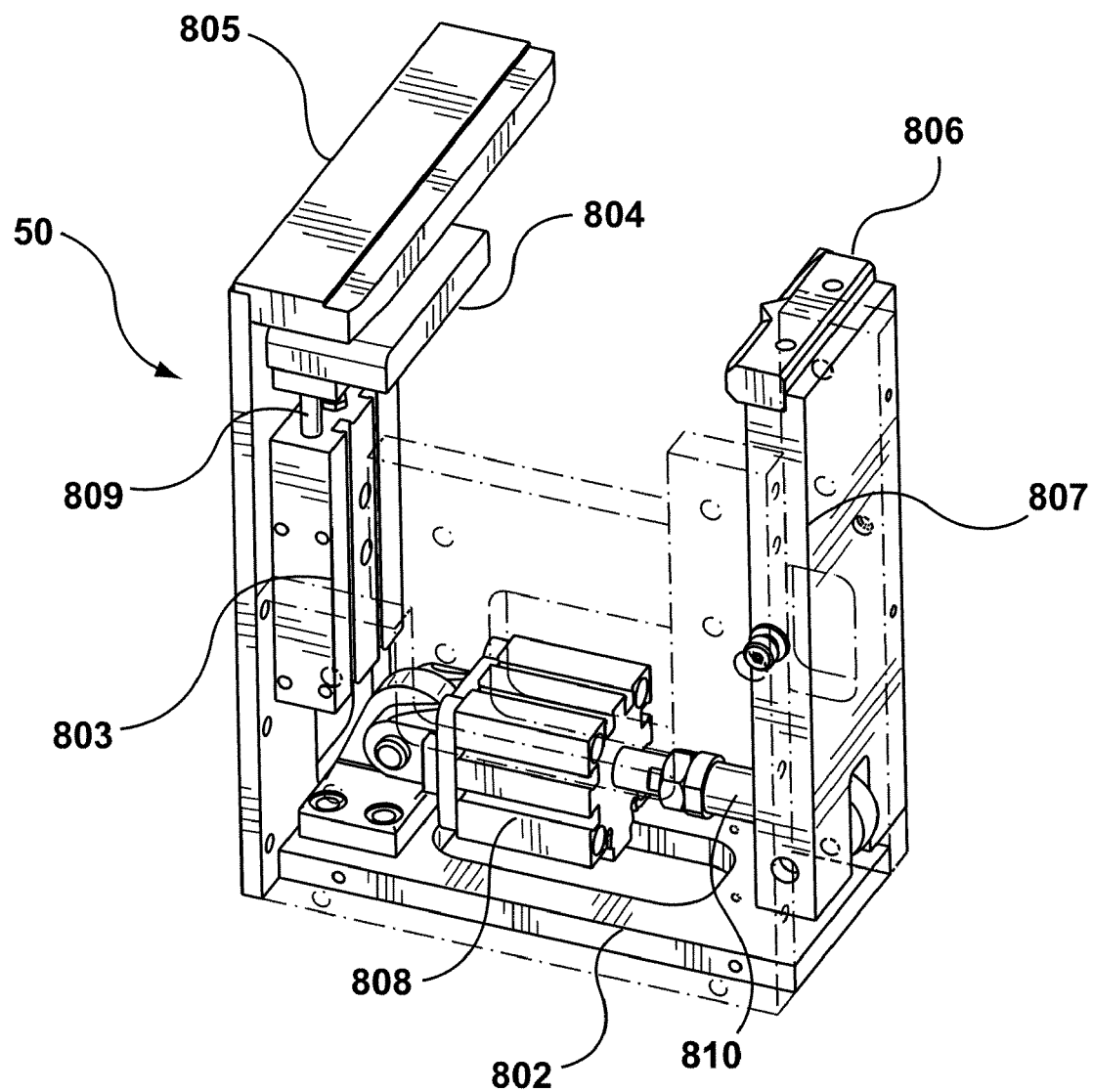
FIG. 19 is perspective view of a puck holding device that can be employed in embodiments of the invention.

At item receptacle loading station 13(*iii*), the movement of pucks 28 is delayed for a period of time, sufficient to allow an item receptacle 22 to be loaded into each puck by an item receptacle dispenser 16 (see FIG. 2). A location device 50 controlled by system PLC 32 can be employed to hold successive puck or pucks 28 in place for a limited period of time, in an item receptacle loading position. An example of such a location device 50 is illustrated in FIG. 19. Device 50 has a frame 802 to which is mounted a pneumatic cylinder 803 having a vertically oriented reciprocating piston arm 809 to which is affixed a lifting pad 804. Also secured to frame 802 is a pneumatic cylinder 808 having a transversely oriented, reciprocating piston arm 810. A vertically oriented plate 807 is affixed to the end of piston arm 810. Plate 807 has affixed at an upper end, a wedge member 806 having a longitudinally extending v-shaped wedge portion. Also integrated with the longitudinally extending wedge, is a v-shaped, vertically extending oriented, ridge portion that is also configured in a vertical v-shape. The operation of the piston arm 810 is such that the ridges of wedge member 806 engage corresponding grooves in puck 28, as illustrated in FIGS. 8*a*-8*c*. When a puck 28 arrives at a station, the puck is first stopped by an extended blocking arm 37. Thereafter, first cylinder 803 lifts the puck 28 vertically away from the belt 36 with lifting pad 804. After that, cylinder 808 pushes lower potion of the plate 807 so that v-grooved wedge 806 engages with the grooves formed in the side of the puck 28 and presses the opposite side of the puck 28 against support bar 805. The reverse procedure can be carried out in order to release the puck 28. The location device 50 is mounted on the frame of the belt conveyor by simply attaching locating frame 802 to it. The operation of arm 37 and locating device 50 is controlled PLC 32.

The type of device such as is sold by SKF or FlexLink AB under model XMPX150A can readily be adapted and employed in this system as a location device 50.

With reference to FIGS. 8*a*-8*c*, a puck 28 is shown which comprises a base portion 41, from which extends upwards, a plurality of upstanding arm members 40*a-c*. Front arms 40*a* extend upwards proximate a leading front edge face 41*a* of base 41 and have an end portion which extends in an angled forward direction. Rear arms 40*b* extend upwards proximate a trailing rear edge face 41*b* of base 41 and have a lower portion 40*b*(*i*) which is substantially perpendicular to base surface 41*e*; a medial portion 41*b*(*ii*) which extends at an angle in a rearward direction relative to the lower portion. Finally rear arms 40*b* have an upper end portion 41*b*(*iii*) which extends at a larger angle in a rearward direction relative to the medial portion 41*b*(*ii*). Oppositely disposed pairs of side arms 40*c* and 40*d*, extend upwards proximate side edges faces 41*c* and 41*d* respectively of base 41, and each have an end portion which extends in an angle transversely outward. The upper portions of arms 40*a* to 40*d* guide an item receptacle 22 received from the item receptacle dispenser 16 onto upper surface 41*e* of puck 28, to a desired flat orientation on the upper surface 41*e* of base 41. The lower portions of all arms 40*a*-40*d* maintain the receptacles in proper longitudinal and transverse orientation during their journey along conveyor path 13 from loading to unloading stations.

It will also be observed that pucks 28 have integrally formed down one side surface 41*d*, a continuous gear tooth mesh 52. As will described hereinafter, gear mesh 52 engages the teeth of a rotating drive gear wheel 43 (See FIG. 5) during movement of puck 28 along part of conveyor path 13. Gear wheel 54 can be driven by a servo drive motor controlled by PLC 32. Although not necessary, an additional gear tooth mesh and corresponding gear drive wheel could also be provided along opposite side surface 41*c*. Alternatively, other types of known intermittent movement drive mechanisms could be used, such as belt driven systems which may for example, employ a servo-motor drive, to move the pucks through item loading station 17 with the desired motion (FIG. 2). It will be appreciated that in many embodiments, it will be necessary that the pucks 28 move through the item loading station 17 with intermittent movement.

Side face 41c of base 41 of puck 28 is provided with a vertically orientated groove 45 that is configured in a longitudinal v-shape. This groove co-operates with the vertical v-shaped wedge portion on the member 806 of the locating and holding device 50 referenced above. The insertion of the vertical v-shaped wedge into groove 45 will provide for longitudinal alignment of the puck along the conveyor path, so the longitudinal position of the puck is known. Side face 41c is also provided with a longitudinally oriented groove 46 that is configured in a vertical v-shape, and the longitudinally extending wedge of member 806 will be located in this groove to enhance the holding of the puck 28.

Side face 41c also has ID markers 44 and 43, which can be detected by a vision or proximity sensing device which are positioned adjacent certain locations along conveyor path 13. The proximity sensing devices are capable of recognizing the presence of, or movement past, of an ID marker 43 or 44, and then send a signal to PLC 32. In this way PLC 32 is notified by a signal of when a puck is in a particular position along the path. The ID markers 43/44 can in some embodiments be simply a steel bolt screwed into the side surface of the puck 28 or other visual marker.

By way of example, one or more proximity sensing devices 48 (See FIG. 2) may be located proximate item receptacle loading station 13(iii) on conveyor path 13. A suitable sensing device that could be employed is the model 872C-D5NP 18-D4 made by Allen-Bradley. Proximity sensing device 48 can detect if and when ID markers 43/44 are in the proper position to activate the holding device 50. As mentioned above, pneumatically activated blocking member 37 (see FIG. 3) controlled by PLC 32, can also be provided in the vicinity of station 13(iii). When in an extended upright position, blocking member 37 will hold a puck 28 in an item receptacle receiving position. It does this by abutting the front face 41a of the puck 28. When the blocking member 37 is retracted in response to a signal from PLC 32, and holding device 50 released, puck 28 is then frictionally engaged again by the upper surface of belt 36 and will move away from station 13(iii). While being held in a fixed position by locating and holding device 50 and or blocking member 37, the belt will continue to move and slide beneath the underneath surface 41(f) of base 41 or puck 28.

The sequence of operation at station 13(iii) is as follows: PLC 32 sends a signal that activates the blocking member 37 to extend it upward to a blocking position. This can be in response to a signal received from a proximity sensor 48 that a puck 28 is approaching the correct position for loading a receptacle. A proximity sensor 48 will then detect an ID marker 43/44. When it does this, a signal is sent to PLC 32, which then sends a signal that activates the holding device 50, such that the puck is lifted upwards above belt 36 and the ridge member 806 then engages grooves 45 and 46 of the first puck. When holding device 50 is being activated, PLC 32 also sends a signal to item receptacle dispenser 16 to dispense an item receptacle 22 onto the puck 28 which is being held below. The next puck 28 will abut the rear surface of first puck 28. A second proximity sensor 48 thereafter will detect the arrival of the next puck 28 in series, by detecting ID marker 43/44. The signal associated with the arrival of the second puck then deactivates the blocking member 37 and activates the holding device 50 to release the first puck 28. With that both pucks 28 advance forward by conveyor belt 36. After a certain delay, (and possibly after receiving a signal) PLC 32 activates again the blocking member 37 to extend it to a blocking position. That stops the next, second puck 28 and the whole item receptacle process starts again from the beginning.

Figure 14A:
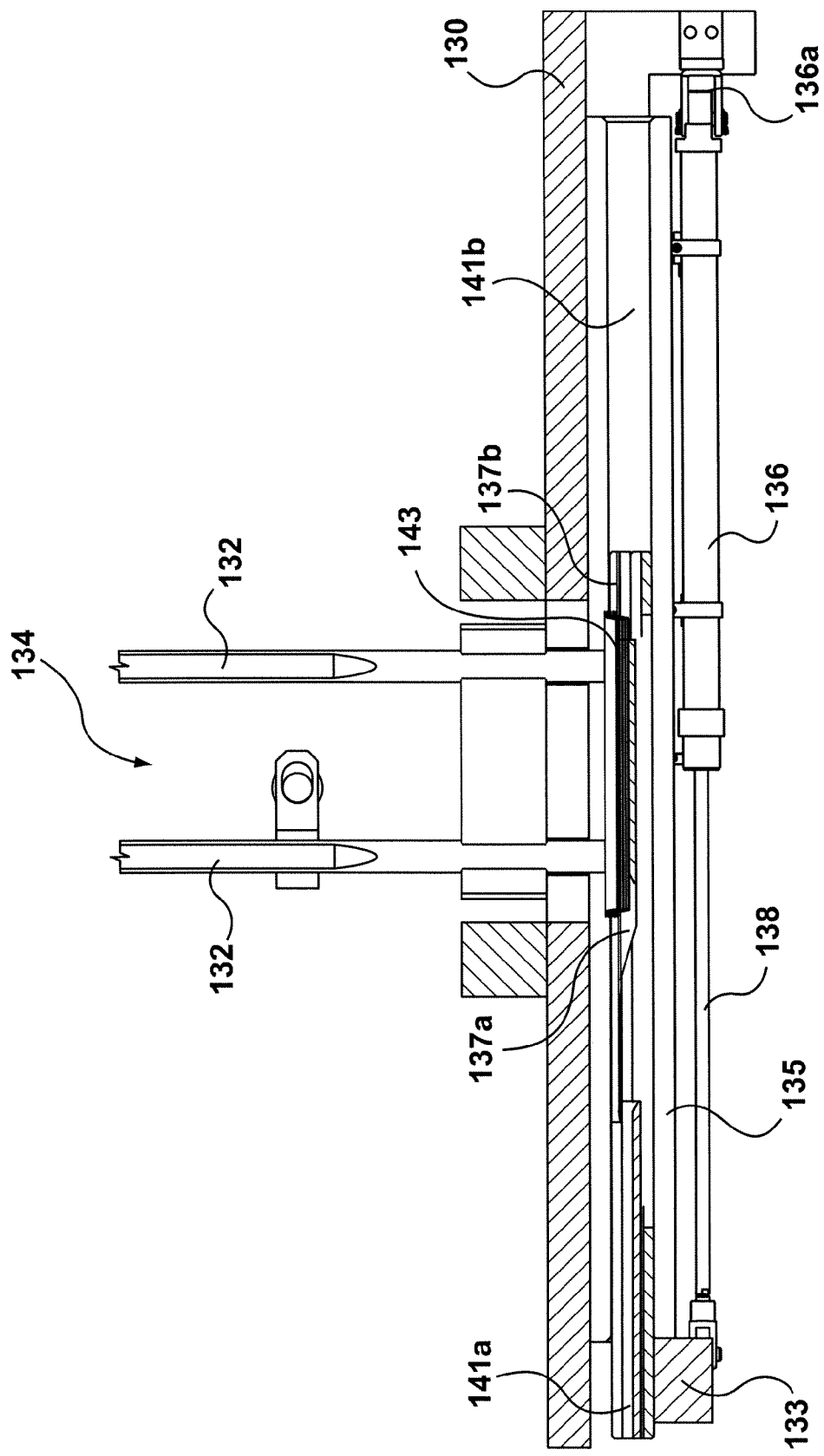
FIG. 14a is a front elevation view of another part of the system of FIG. 1.
Figure 14B:
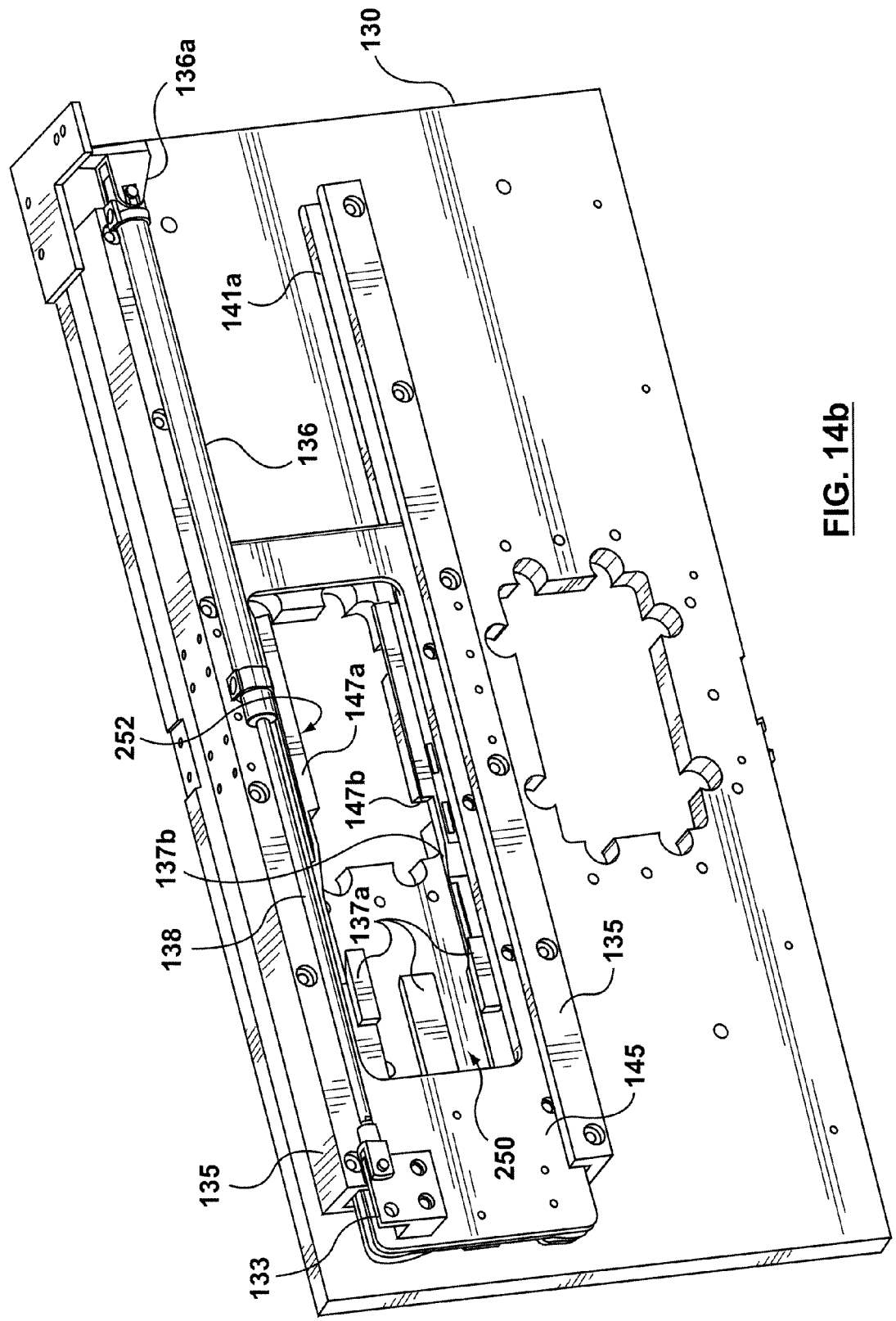
FIG. 14b is a bottom perspective view of the part of FIG. 14a, for clarity shown with only one item receptacle dispenser mechanism.
Figure 16B:
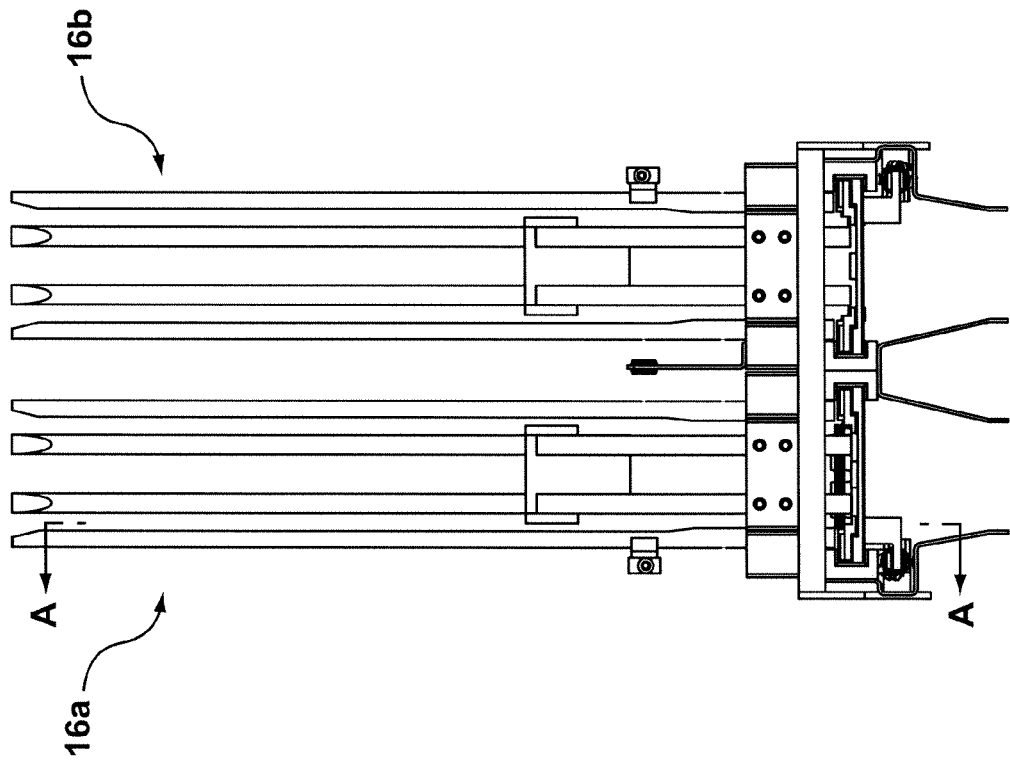
FIGS. 16a and 16b are front elevation and side elevation views respectively of the part of FIG. 14, shown in the second of three sequential operational positions.
Figure 16A:
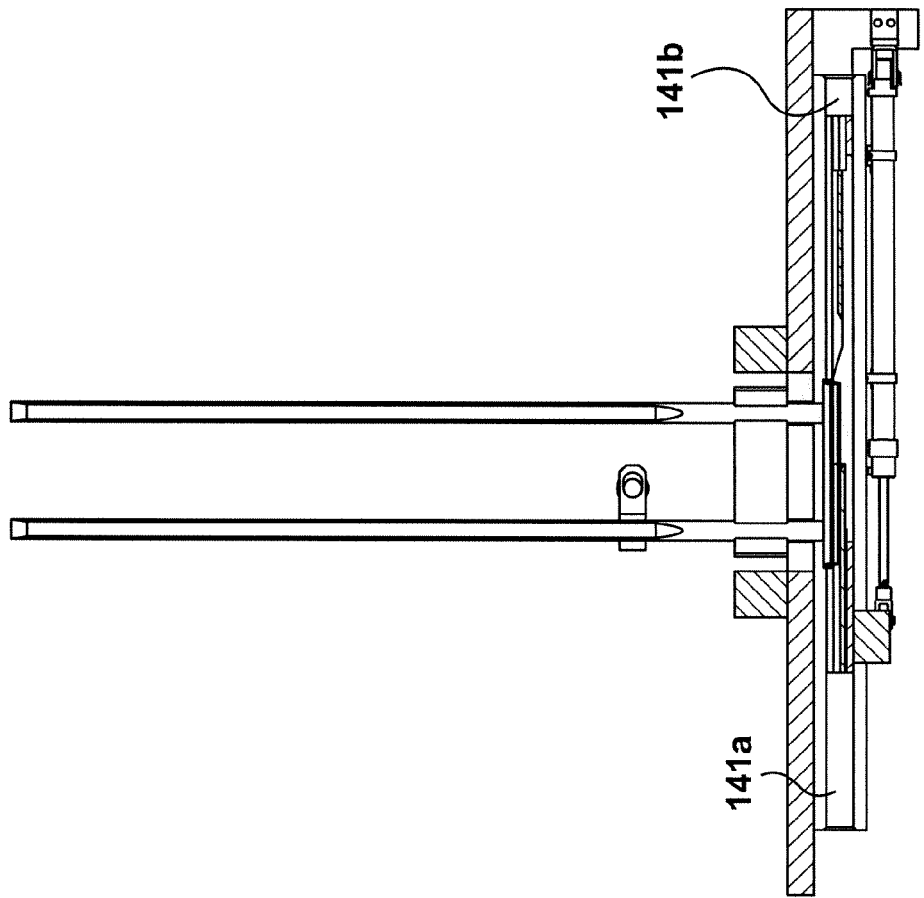

With reference now to FIGS. 14a and 14b, an item receptacle dispenser 16 is illustrated in detail in side view and perspective view. Dispenser 16 comprises a plate frame generally designated 130 and a magazine 134. Magazine 134 holds a series of stacked receptacles 22 between upstanding rods 132, which holds the stack in a generally vertical orientation. The receptacles 22 in the stack may be in a nested arrangement. It is necessary to separate a single receptacle 22 from the stack and deposit it onto a puck 28. Because of the stacked, and also possibly the nested, arrangement of the receptacles 22, this is not easy to accomplish. However the dispenser 16 is adapted to accomplish this task.

As shown in FIGS. 14a and 14b, dispenser 16 includes a pneumatic cylinder 136 that has one end 136a secured to an end portion of frame 130. Cylinder 136 has a reciprocating piston arm 138 at the opposite end which has an end secured to a slidable block 133. Block 133 is secured to the bottom of a slidable plate member 145, which is slidable in a pair of spaced rail members 135. Accordingly, by operation of cylinder 136, the plate member 145 has reciprocal movement on longitudinal rail members 135. The reciprocating movement of arm 138 caused by double acting cylinder 136 is controlled by PLC 32 with which it is in communication.

Note, in FIG. 14b, only one of the two plate members 145, cylinder 136 and other components is shown, for clarity.

Frame 130 has an aperture 252 formed therein, through which is received the stack of item receptacles 22.

Plate member 145 has a pair of spaced edge blades 147a, 147b at one end of an opening 250 in plate member 145. A set of ramp members 137a are directed toward the end of aperture 250 where the blades 147a, 147b are disposed. Cavities 141a, 141b are provided at each end of the frame.

In use, and as shown in successive FIGS. 15a, 15b; 16a, 16b and 17a, 17b, each of the edge blades 147a, 147b moving in one direction from when the piston 138 is retracted, will engage between side lips 22e of a first bottom receptacle and an adjacent receptacle stacked on top thereof. The blades 147a, 147b will strip off the bottom receptacle in the stack and move it towards the end cavity, and it will drop the receptacle through aperture 252 in plate number 145 onto the puck 28 from the cavity 141a.

When plate member 145 moves in the opposite direction, the ramp members 137a will engage the bottom receptacle of the remaining stack of receptacles 22 and tend to lift the stack back up to a position where it will be ready again to repeat the process of having edge blades 147a, 147b, peel the next receptacle from the bottom of the stack.

Thereafter, a mechanism can be provided which will ensure the presence and proper placement of a receptacle 22. Such a mechanism could be a camera vision system. However this mechanism can also be a pneumatic cylinder arrangement 300 such as is shown in FIGS. 18a and 18b. Piston arrangement 300 includes a frame 314, which can be mounted to part of the system frame 15. A double acting pneumatic cylinder 310 has one end mounted to an end portion 314a of frame 314. The cylinder 310 has a piston arm 312, which can be extended and retracted. The outer end of piston arm 312 is fixed to the end of pivot arm 318. Pivot arm is mounted for rotation with a pin 322, and can rotate between the two positions shown in FIGS. 18a and 18b. When operated, piston arm 312 can be retracted from a first position in FIG. 18a to a second position shown in FIG. 18b. This causes the end 320 of arm 318 to rotate downwards towards the upper surface of the puck 28 that is being held at the station. If a receptacle 22 has been loaded and is in the proper position, the piston will reach a certain position in its stroke and will be unable to complete its full stroke downward. The result is a signal is sent to PLC 32, which signifies a receptacle has been properly received on the top surface of base 41 of puck 28. The PLC 32 will then send signals to the blocking member 37 to retract, and then to holding device 50 to release the puck 28. The belt 36 will then frictionally engage the under surface 41(f) of puck 28 and that puck will then move forward along conveyor path 13.

Further along the conveyor path 13 is the downwardly sloped ramp portion 13(iv) that provides item loading station 17 (FIG. 2). The slope of conveyor 13 path and the corresponding belt 36 is at an angle alpha which will be selected, dependent upon several factors including the nature of the items 20 and the receptacles 22. For items comprising blister battery packages to be loaded into tray receptacles 22, it has been found that an angle alpha in the range of about 20 to 40 degrees works well, and that a most preferred angle for alpha is about 30 degrees. The trajectory of the items 20 as they are delivered to the receptacle will be close to perpendicular to slope of the conveyor path and to the orientation of the upper plane of the base of puck and the receptacles. However, as will be described later, this trajectory can be varied by several degrees from perpendicular to the slope, and this can provide an impact of each item 20 upon an energy absorption device to provide for the desired energy absorption of the item 20 before it is delivered into the slot 22a of a receptacle 22.

Figure 5:
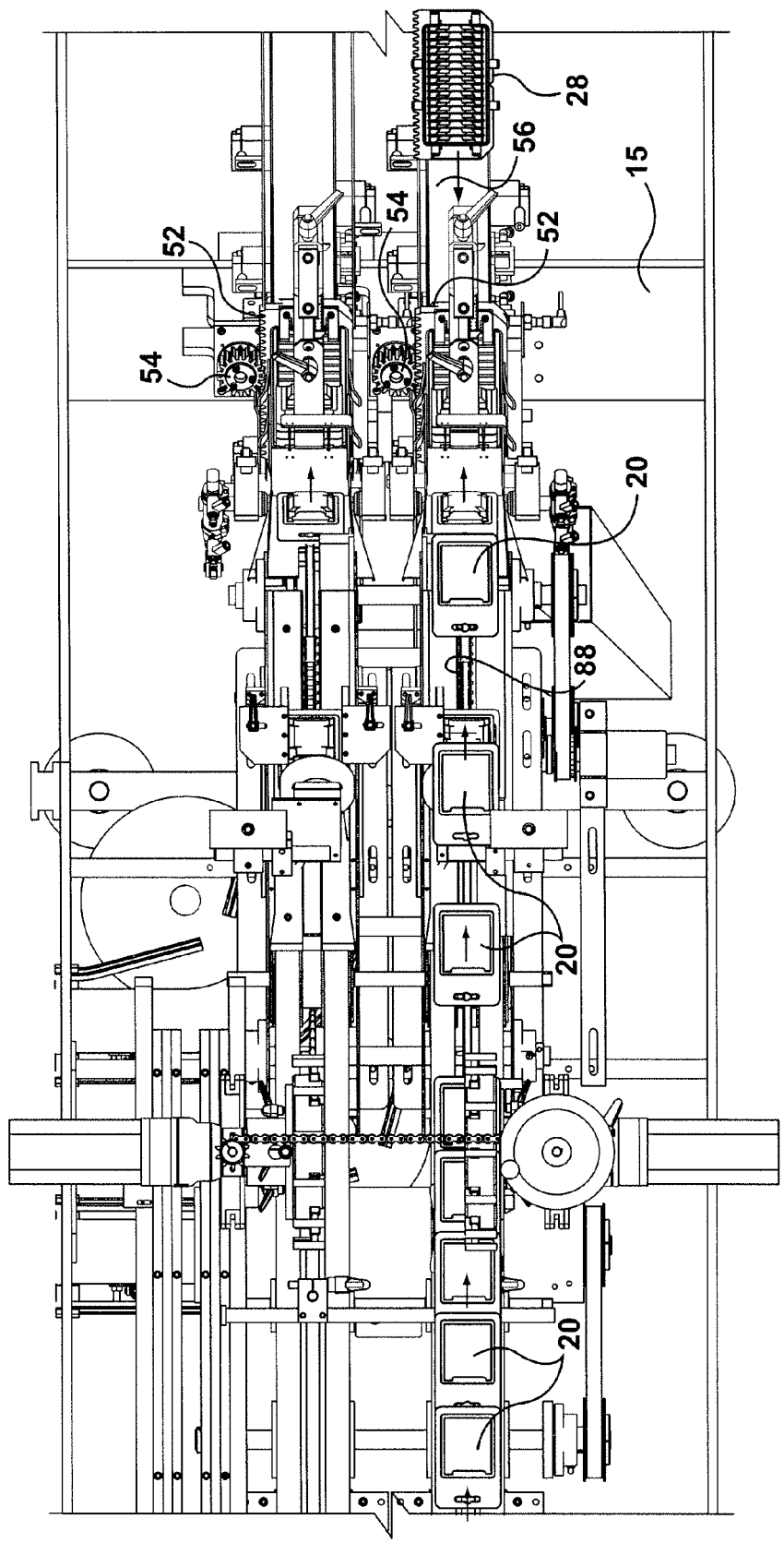
FIG. 5 is an enlarged view of portion of FIG. 1, designated as 5 therein.
Figure 6:
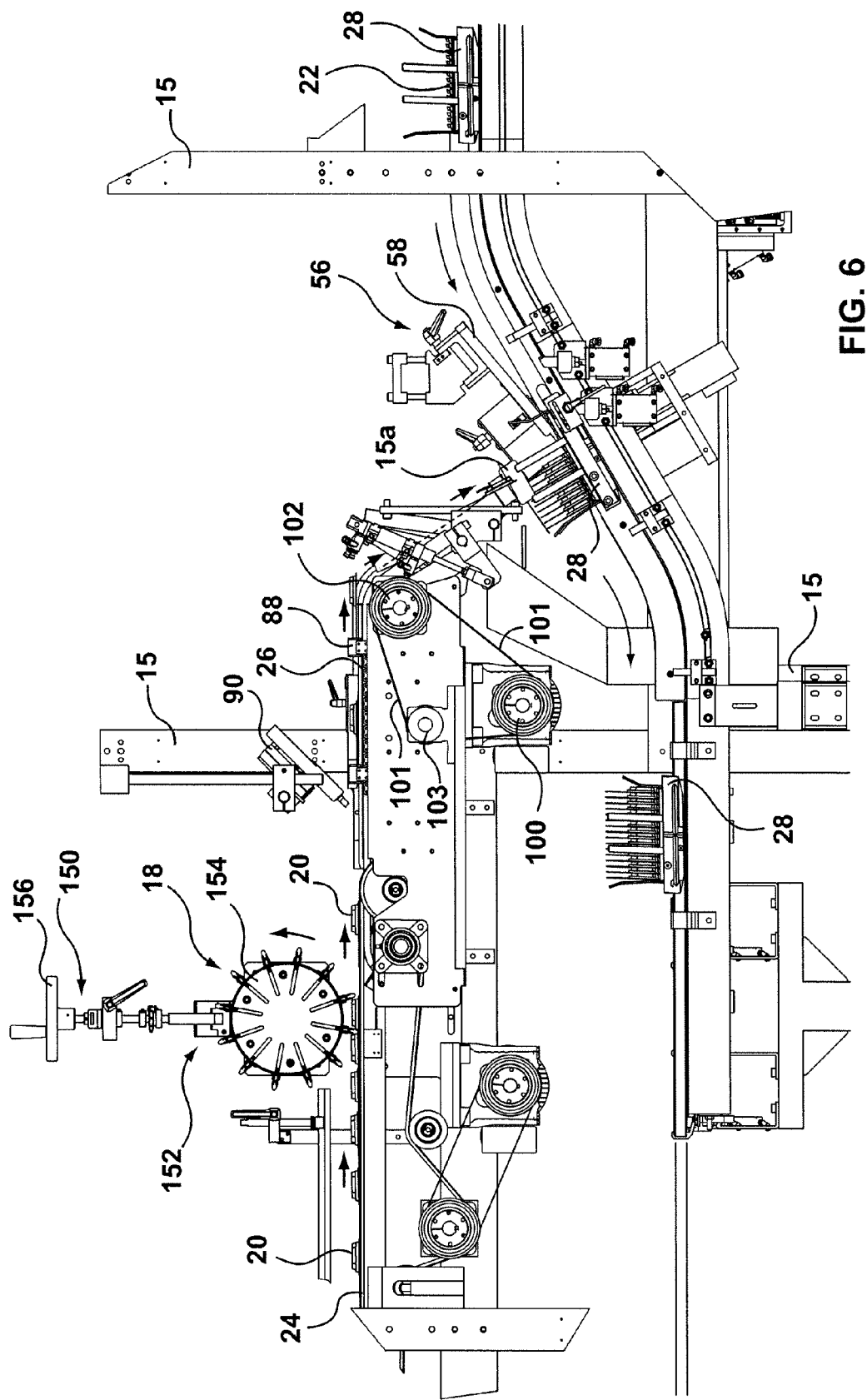
FIG. 6 is another enlarged view, similar to FIG. 4, but of a larger portion of FIG. 3.

Several items 20 are delivered by item delivery conveyor 14 in series into an item receptacle 22 being held in a puck 28, which is at the item loading station 17. Also at this loading station 17, as shown in FIGS. 5 and 6, a mechanism is provided that moves the pucks through the station with indexed intermittent motion that allows for the receptacle 22 to be filled with items 20. This motion can, as illustrated, be effected by having a drive gear wheel 54 engage edge that provides longitudinal tooth mesh 52 on side surface 41d of puck 28. The result is that rotation of gear wheel 54 will cause and translate into longitudinal movement of the mesh 52. This results in the longitudinal movement of the puck 28 in the same direction, as conveyor belt 36 is moving. The gear wheel 54 can be driven for intermittent rotation resulting in intermittent longitudinal movement of puck 28 through the item loading station 17. The intermittent movement of puck 28 in a longitudinal downstream direction allows successive items to be loaded into the item receptacle 22. The amount of rotation of the gear wheel 54 can be selected to provide for suitable longitudinal movement of the puck 28, to allow for the proper placement of successive items 20. The gear wheel 54 can be driven by a servo-drive motor such as model NTM-207-CBNS-0000 manufactured by EMERSON. The operation of the drive motor for gear wheel 54 can be controlled by PLC 32.

It is preferred that the spacing of the slots in the item receptacles 22 is directly related to the number and spacing of the teeth on the gear wheel 54/mesh 52. The spacing relates to gear rotation as $360/2.25\pi$ deg to 1 inch of spacing.

It is preferred that more than one puck 22 be at the item loading station 17 at the same time. This is so that while one puck is being loaded, the next puck in series has its front face abutting the rear face of the leading puck. This enables the gearing system to move seamlessly from loading one puck to loading the next puck (i.e. there is no break in the engagement of teeth of the gear wheel 54 between the mesh of one puck to the mesh of the next puck). The relative position of the gear wheel 54 relative to the pucks is continually maintained, without the system having to re-set or re-calibrate every time after each puck has been loaded to the item loading station 17.

When a puck 28 arrives at item loading station 17, the puck will be in abutment with another puck 28 that is in front of it. Once the leading puck is loaded, it will become disengaged from the gear wheel 54. While each puck 28 is moved down the sloped ramp through the item loading station 15, controlled by the movement of gear wheel 54 engaging mesh 52, the conveyor belt 36 will independently continue to slide forward relative to the puck 28. This motion will be executed until a proximity switch 48 (at 13(iv)) sees mark 44. It is only when the mesh 52 becomes disengaged from the gear wheel 54, that the belt 36 will frictionally re-engage the base of the puck and move that puck down the rest of the ramp portion 13(iv) and onto horizontal conveyor path portion 13(v) at the same speed as the belt 36. It will be noted that the frictional interaction may be selected such the frictional force acts against the force of gravity acting on the puck tending to push the puck down the ramp. The frictional force will thus prevent the puck sliding down the slope, but instead will move with belt 36.

Figure 7:
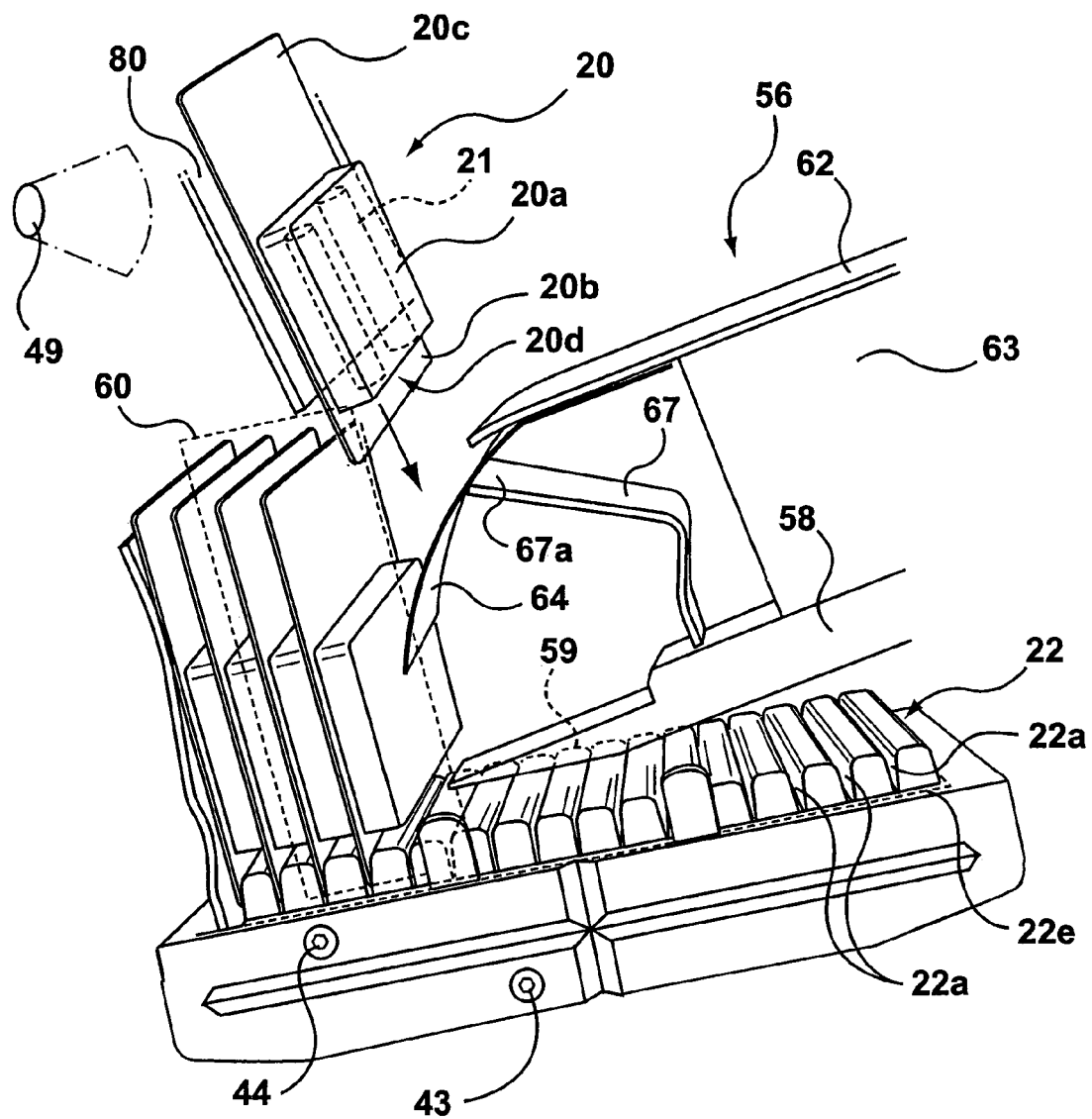
FIG. 7 is a schematic, side perspective view of a receptacle held by a puck device being loaded with a battery pack, employed in the system of FIG. 1.

Also to assist in loading items 20 into the receptacle 22, a positioning assembly generally designated 56 can be provided as shown in FIGS. 2a, 5, 6 and 7. In this embodiment, assembly 56 mounted (in a manner not explicitly shown) to part of the system frame 15. Assembly 56 includes a base plate 58 and a top plate 62 interconnected by a block member 63. As shown in FIG. 7, base 58 has an extension portion 59, which provides energy dissipation for items 20, which strike an outer end of extension 59. Extension portion 59 may simply be made from a metal such as steel. Alternatively, it may have positioned on an upper surface thereof a material such as rubber, with suitable energy absorption properties. When an item 20 strikes the end of extension 59, a significant amount of its energy will be dissipated.

Assembly 56 also includes a resilient spring plate 64 affixed proximate one end to the underside surface of top plate 62. A spring cantilever support member 67 is provided and has an end portion 67a, which contacts a rear surface of spring plate 67. Spring plate can for example, be made from a thin strip, such as for example 28 gauge of steel or other suitable resilient material. Other force exerting mechanisms to move the items longitudinally so the items slide into the next open slot 22a, could also be employed such as ultra high molecular weight polyurethane.

Also at item loading station 17, is an item-loading chute 80. Items 20 being fed from item feed conveyor 14 are fed onto chute 80 (as described in detail below), and then fall down the top surface of chute 80.

Figure 9A:
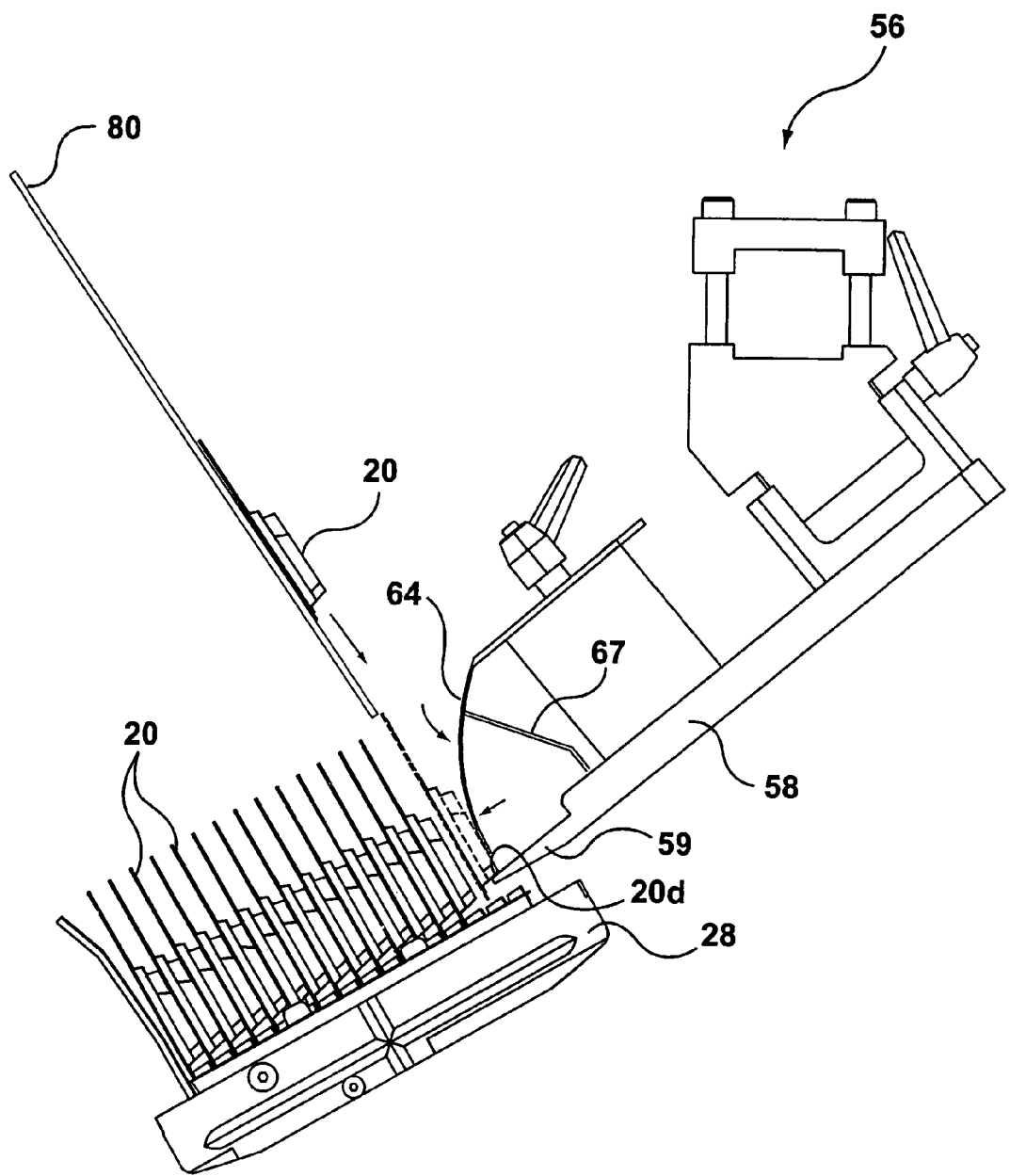
FIGS. 9a and 9b are schematic side elevation views, similar to FIG. 7, showing the loading of a battery pack into a receptacle held in a puck device.
Figure 9B:
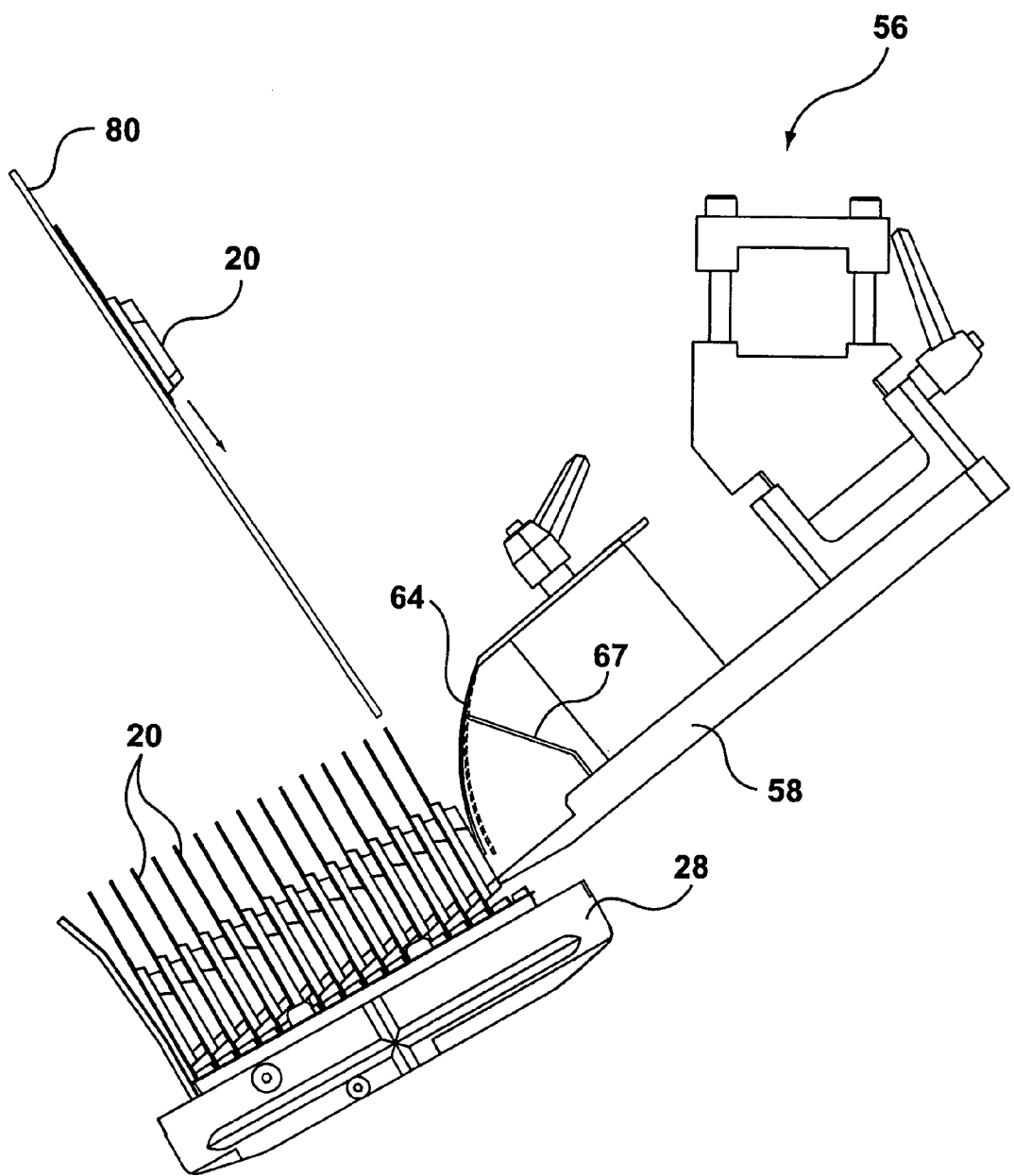

With reference to FIGS. 7, 9a and 9b it will be seen that the incoming trajectory of an item 20 can vary from being perpendicular to the slope of conveyor path 13. However, the trajectory, could be substantially perpendicular in some embodiments. However, in this embodiment, the trajectory is such that items 20 will exit the chute 80 and the lower part of the blister portion 20a will impinge against and resiliently displace a lower portion of spring plate 62. The trajectory is such that at least a portion of the lower face 20d of portion 20a will first displace the spring plate 62 and then impact on the end of plate extension 59. The result is that although the item 20 will rebound upwards a small amount after striking against the end of plate extension 59, most of its energy is dissipated. After the impact, item 20 will be pushed by spring plate 62 towards the previously loaded item 20 held in the receptacle, and will be guided into its own respective slot 22a in the receptacle, in part by the previously loaded item. It may be appreciated that without this energy dissipation mechanism and spring mechanism, if it was attempted to feed the item directly into the slot 22a, the item 20 might bounce out and may not be easily received into the slot.

It should be noted that the first item loaded into each receptacle 22 will be guided in part by rear arms 406 of the puck 28 (not shown in FIG. 7, but shown in FIGS. 8a-8c).

In some embodiments a spring mechanism alone may provide sufficient guidance to feed an item 20 which bounced out of a slot 22a, back into the slot 22a.

Other energy dissipation mechanisms could be employed such as providing a magnet mounted under top surface of extension portion 59, which might exert a magnetic attractive force on a suitable item.

While the disclosed embodiment contemplates using gravity to assist in directing the item down a chute and into a slot 20a, in other embodiments the items may be propelled toward a slot by other mechanisms.

Returning to FIG. 7, a proximity sensor 49 is also employed in the vicinity of loading station 17. Sensor 49 may be a model VS2KAPSVQ manufactured by BANNER and will detect the movement of an item 20 past it in the vicinity of the chute, preferably the lower portion to the chute 80. Proximity sensor 49 is adapted to send a signal to PLC 32 in response to the detection of an item. In response to the signal, PLC 32 causes the gearing wheel 54 to be rotated to index the puck 28 forward, once sufficient time has elapsed for the last item loaded to be received in the slot 22a. The next slot is then properly positioned to await the next item being fed by item feed conveyor 14.

Turning now to item delivery conveyor system 14, this conveyor system is shown schematically in FIGS. 2 and 2a. Item delivery conveyor system 14 includes a first stage item in-feed conveyor 24, a metering device 18 and a second stage item delivery conveyor 26. Items 20 are fed randomly on conveyor 24 to the metering device 18. Metering device 18 in the illustrated embodiment is a star-wheel 154 (illustrated in detail in FIGS. 10-13), and has a plurality of fingers 176 extending from a central wheel comprised of inner disc 160 and outer disc 158, as described below. The distance X between the end portions of consecutive fingers 176 can be chosen so that one item 20 will just fit there between. The conveyor 24 can be set to operate within a fairly wide range of speeds with items 20 at a variable and even random pitch. However, the speed and item pitch are generally selected so that there will always be an adequate supply of items 20 being fed to metering device 18, and that an average delivery rate over a period of time will be at least enough to keep the metering device 18 supplied with items.

Metering device 18 is controlled by PLC 32 and when activated will rotate a sufficient amount to release item to move forward again on conveyor 24. With 23 finger members 176 (12 arcuate gaps between fingers) the fingers will normally be equally spaced radially at 30 degrees apart. When PLC 32 sends a signal to meter device 18, the metering device drive motor will rotate the wheel, 30 degrees, which will cause one item 20 to be released to conveyor 26.

Second conveyor 26 is also a belt conveyor with a belt 86 but includes a series of upstanding lugs 88 mounted thereon. Lugs 88 can be set at a specific, constant pitch on belt 86. Conveyor belt 86 is driven conventionally at a speed that is less than belt 31 of conveyor 24. Also the timing of release of an item from metering device 18 is such that the faster moving belt 31 will move an item and ensure that it is in abutment with the rear of a lug 88 on belt 86. The movement of belt 86 can be driven by a drive motor 102, which is interconnected with a belt 101 that is tied to an encoder 100. Encoder 100 sends pulsed signals to PLC 32 based on its rotational position. In this way, PLC 32 is aware of the specific position of belt 86 and the lugs 88 contained thereon. Thus, as PLC 32 knows the position of the lugs 88, when a lug is at an appropriate position, it can send a corresponding signal to operate the metering device 18 to release an item 20 at the correct time, so that the item 20 will reach a lug 88 in a proper position.

Once on conveyor belt 86, the item 20 is carried toward the entry to chute 80. During this movement of item 20 on belt 86, a camera vision system 90 is triggered at a particular position by PLC 32 to take a digital photo of the upward facing surface of the item 20. The camera system could be a model DVT530 made by BANNER which includes image recognition capability. The image recognition is done by the camera's own controller and it provides to the PLC 32 only information of whether a particular image passed or failed. The image taken by the camera system 90 is then processed. The result of this image processing may enable the system/PLC 32 to determine several criteria such as for example (a) whether there an item there at all; (b) whether the item in the right orientation; (c) whether the product(s) such as batteries held in a transparent blister package are in the right orientation; (d) whether there are any product(s) missing in the blister package; (e) special coupon present. If as a result of the image processing, the image does not meet the specified criteria, the PLC 32 will carry out a reject operation on that item to be rejected.

Figure 4:
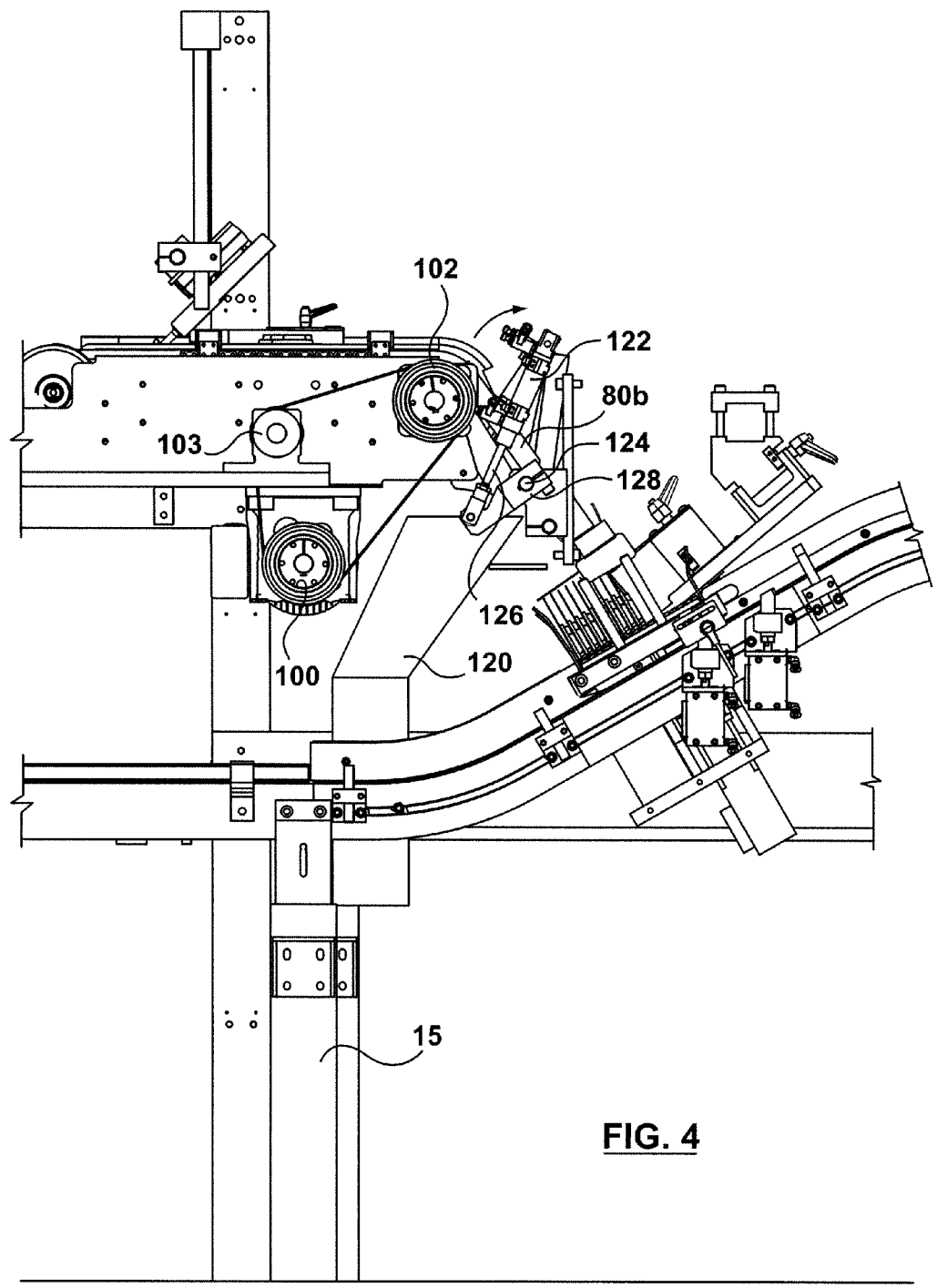
FIG. 4 is an enlarged view of portion of FIG. 3, designated as 4 therein
Figure 4A:
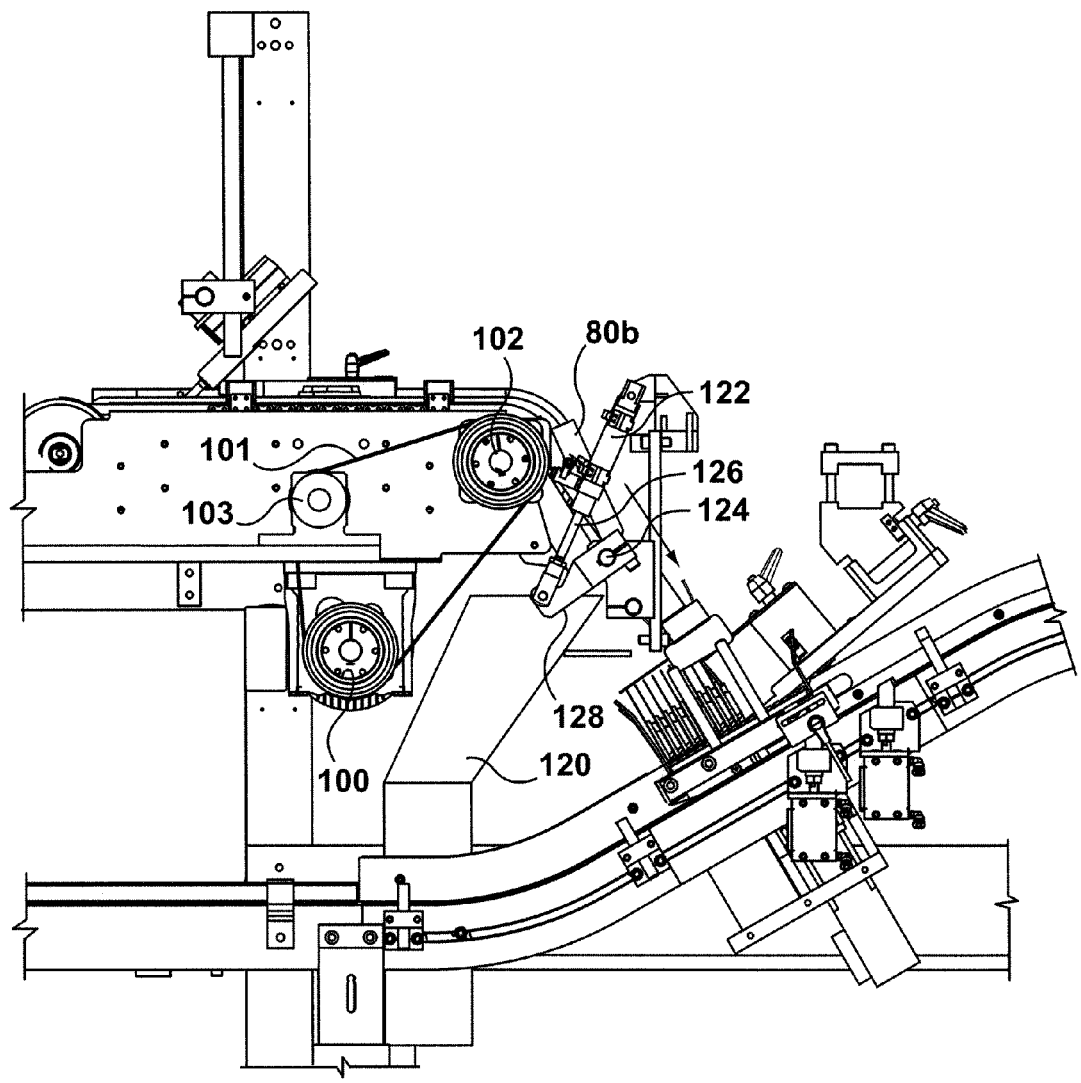
FIG. 4a is a view similar to FIG. 4, but illustrating in solid lines the components of the item reject system in an item non-reject position.
Figure 4B:
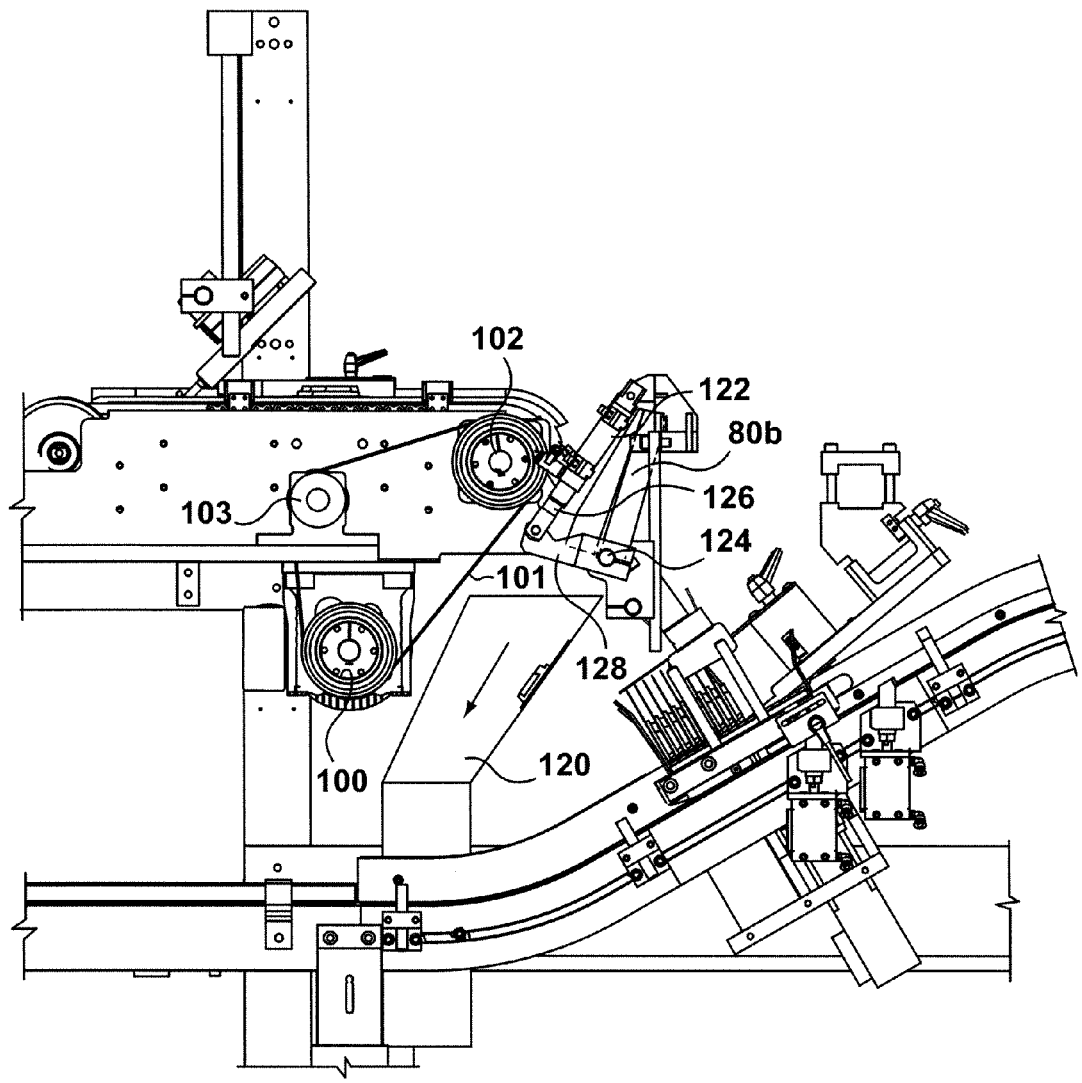
FIG. 4b is a view similar to FIG. 4a, but illustrating in solid lines the components of the item reject system in an item reject position.

To facilitate rejection of items that do not meet the specified criteria, an item reject chute 120 is provided. With reference to FIGS. 4, 4a and 4b, items 20 will fall into a reject chute 120 through a gap created by the rotational movement of an upper portion 80b of feed chute 80. Upper chute portion 80b, is pivoted clockwise (see FIGS. 4a and 4b) to provide a gap through which a rejected item will fall. The rotation of chute portion 80b is facilitated by a pneumatic cylinder 122 having a piston arm 126, interconnected to an arm member 128 that can pivot about a pin 124. Arm 128 is interconnected to the upper chute portion 80b.

When an item is identified as being a reject, PLC 32 sends a signal that activates cylinder 122 causing piston 126 to retract. This movement causes arm 128 to rotate clockwise around pivot 124, which in turn causes upper chute portion 80b to rotate clockwise, opening up a gap. When the reject item reaches the end of conveyor belt 86 it will fall through the gap into reject chute 120.

With reference to FIG. 6, metering device 18 includes a wheel member generally designated 154 mounted to a frame 152 with a height adjustment mechanism 150. By rotation of a handle 156, the height adjustment mechanism 150 can be operated to adjust the height of the wheel 154 relative to conveyor 24 and items 20 carried thereon.

Figure 10:
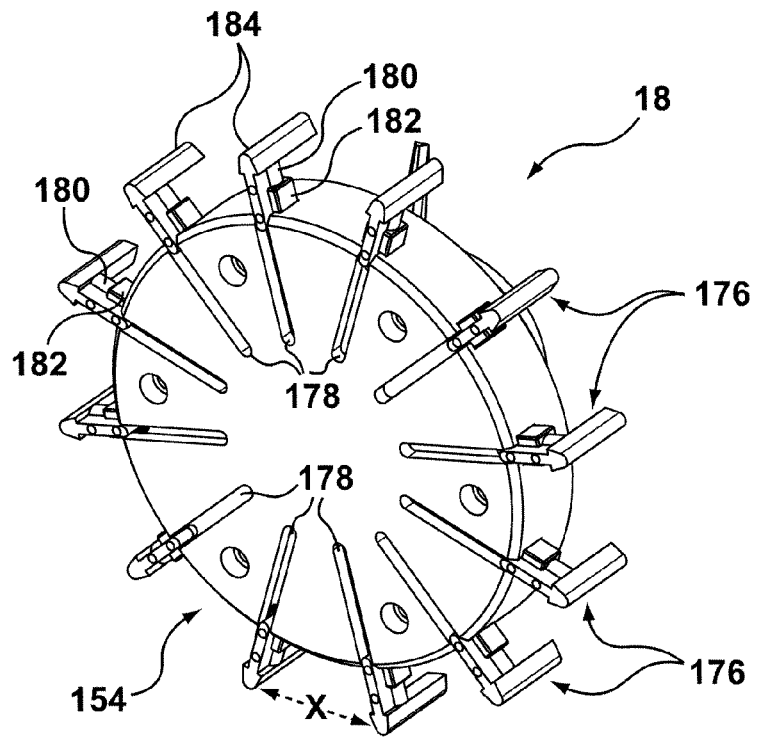
FIG. 10 is a front perspective view of a battery pack metering device in isolation, and which forms part of the system of FIG. 1.
Figure 11:
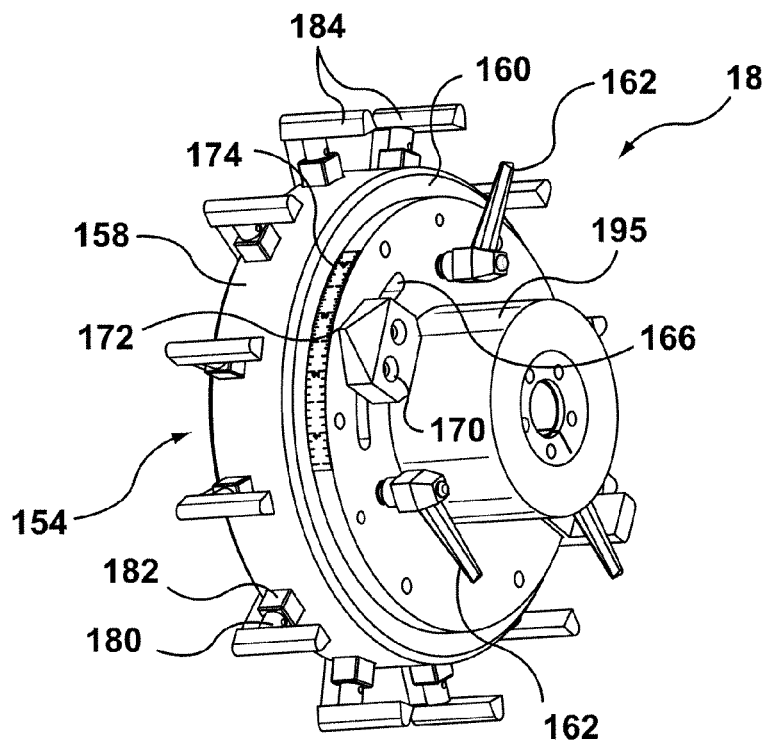
FIG. 11 is a rear perspective view of the metering device of FIG. 10.

With reference to FIGS. 10 and 11, wheel 154 includes an outer disc member 158 and an inner disc 160, which are bolted together and do not move relative to each other. A hub member 195 that may be integrally formed at an outer surface of disc 160 is adapted to be mounted to a shaft connected to a drive motor (not shown). The drive motor, which may be a servo drive motor, is controlled by PLC 32. Thus, discs 158 and 160 can be rotated intermittently about the drive axis provided by the drive shaft.

Discs 158 and 160 are configured such that an inner cavity 165 is provided and defined by the inner surfaces of the discs. Within the cavity 165, a circumferentially recessed portion 161 is provided in disc 158. A middle disc 801 sits inside the recessed portion 161 and is held therein between the outer and inner discs 158 and 160. The configuration is such that middle disc 801 can rotate around a middle axis common with the drive axis of rotation of discs 158 and 160 within recess 161. Block 170 is bolted to bolt holes 189 in middle disc 801 through slot 168. Thus block 170 can rotate around the central axis as middle disc 801 rotates around the same axis. Handle locks 162 are used to lock middle disc 801 in desired position relative to the discs 158, 160.

Block 170 rests against an outer surface of inner disc 160 but can slide relative thereto. Block 170 has an arrow tip 172, which points to a position on a ruler 174. Ruler 174 is calibrated to indicate the separation distance between adjacent finger members 176 on wheel 154, as will be described further hereafter. If block 170 is rotated in slot 168 relative to discs 158, 160, then the position of tip 172 will move along ruler 174. The position of tip 172 can be selected to provide a desired spacing of finger members 176. Finger members 176 are generally spaced equally, in this embodiment at about 30 degree intervals, around the wheel 154.

As shown in FIGS. 10-13b, each finger member 176 includes a radially extending rod member 180 that is housed and held within a radially extending sleeve 182. Each sleeve 182 is mounted for radial movement with rod member 180 within a radially extending slot 178 in outer disc 158. At the outward end of each rod 180 is a transverse wedge shaped bar 184 which is suitably configured to be able to block an end of an item 20 located on conveyor 24. Thus an item 20 can be held snugly between two finger members 176. When the wheel 154 is rotated, a single item 20 held between two finger members can be pushed downstream.

Figure 12A:
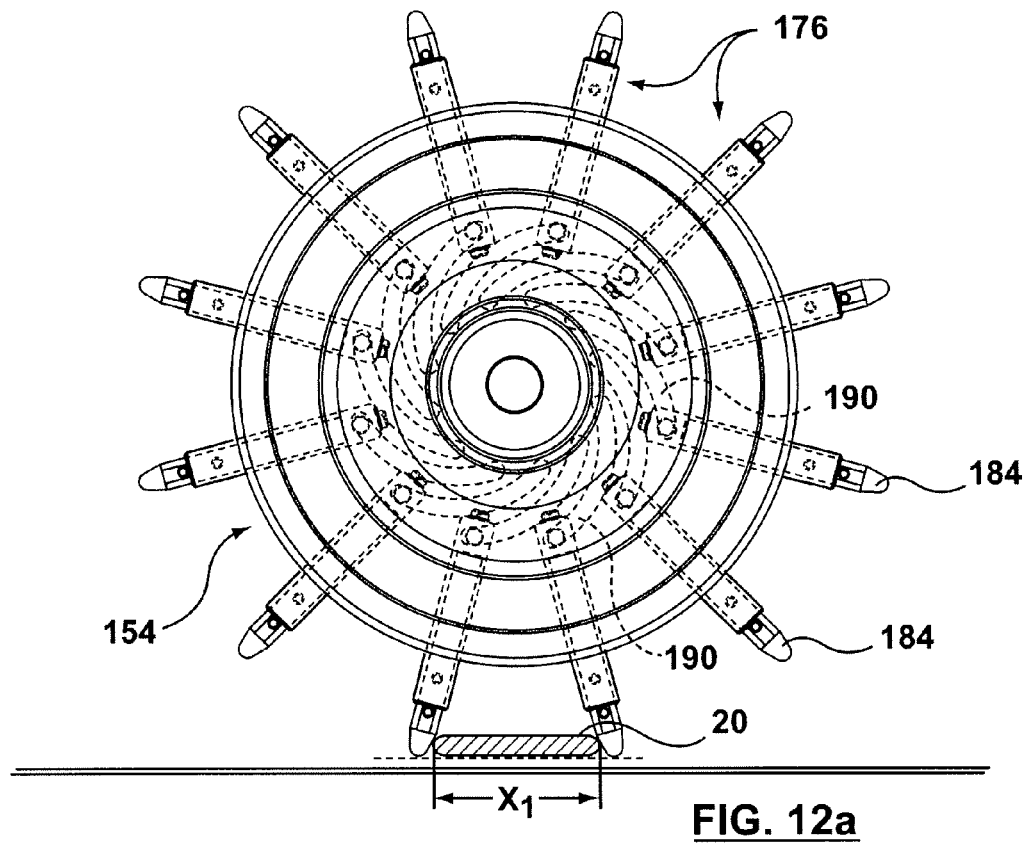
FIG. 12a is a side front elevation view of the metering device of FIG. 10, showing certain interior components thereof, in shadow outline, with fingers in a fully extended position.
Figure 12B:
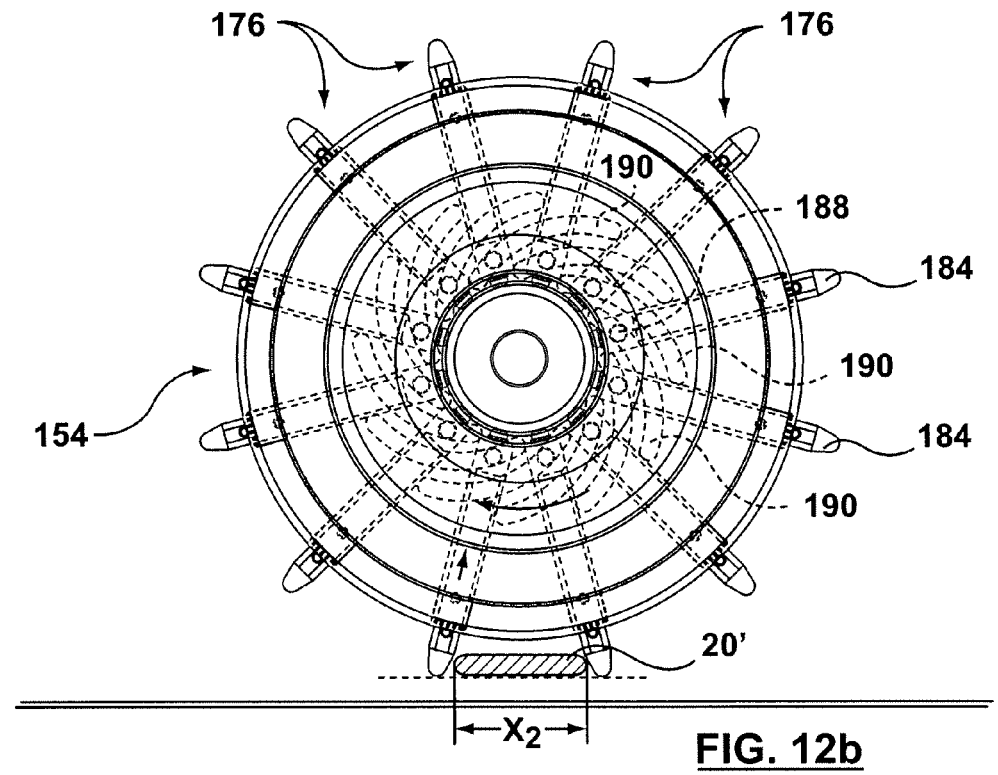
FIG. 12b is a similar view to FIG. 12a, but showing the fingers in a fully retracted position.

As shown in FIGS. 12 and 13, at the inner end of each sleeve 182 is a pin member 188 which is retained in the cavity provided by discs 158 and 160. Each pin 188 extends outward towards a surface 801a of middle disc 801 and is received into a cam track or channel 190 machined into surface 801a middle disc 801. Track 190 may also be formed in other ways such as by guide side rails, which hold the pin member 188. Pin member 188 acts as a cam follower and it will be apparent that as middle disc 801 is rotated from the position shown in FIG. 12a, clockwise relative to outer disc 158, the cam follower 188 moves along the cam track to the position shown in FIG. 12b. The result is that each rod 180/sleeve 182 of each finger member 176 will retract in its respective sleeve 182, and the spacing X between adjacent fingers will be reduced from X1 to X2.

By rotating the middle disc 801 in the opposite direction relative to outer disc 158, the pins 188 will move in the opposite direction in the cam track 190, which will cause the finger members 176 to expand. The distance X between finger members 176 can thus be selected depending upon the length of the items 20 on conveyor 24.

The general operation of the sub-system 10 is as follows. Pucks 28, with neither a receptacle 22 nor any items 20, move in series up generally upwardly sloped ramp portion 13(i) on conveyor 12 assisted by conveyor 23. The pucks 28 then move along generally horizontal upper section 13(ii) to conveyor portion 13(iii), which provides the item receptacle loading station. At this station, the holding mechanism described above is initiated by PLC 32, and a puck 28 is held by holding device 50. PLC 32 also then sends a signal to dispenser 16 causing dispenser 16 to load a receptacle into puck 28 such that it will lie substantially flat on the base of the puck 28. Once the item receptacle 22 is loaded, the receptacle checking mechanism can check the receptacle 22 is properly placed in the puck 28, and if a receptacle is properly seated, an appropriate signal is sent to PLC 32. If not, another signal is send to PLC 32 providing an alarm.

This will cause the system to shut down so the problem can be corrected. However, if a receptacle 22 is properly situated on a puck 28, the corresponding signal causes PLC 32 to send a signal to holding mechanism 50 such that the puck 28 is released by holding mechanism 50. The puck 28 then moves to, and starts to travel down, downwardly sloped ramp portion 13(iv) to item loading station 17. Once the puck reaches station 17, will abut another puck 28 already being loaded by the item loading apparatus. Once the previous puck is loaded, the gear wheel 54 will seamlessly disengage from the previous puck and the mesh 52 of the new puck 28 will be engaged by the teeth of gear wheel 54. The puck 28 will then be moved intermittently through the loading sequence. The intermittent longitudinal movement of the puck 28 will correspond to the intermittent rotation of the gear wheel 54, which is controlled by PLC 32. The intermittent movement of the puck 28 will be controlled by PLC 32, which receives signals from the proximity sensing devices detecting the presence of ID markers 43 and 44, and from the proximity sensor 49. It will be recalled that sensor 49 is adapted to send a signal to PLC 32 in response to the detection of an item passing down the chute 80 to be loaded into the receptacle held in a puck 28 at loading station 17. As described above, items 20 are fed to loading station 17 by conveyor system 14.

After being fully loaded with items 20 into the receptacle 22, the puck will be released and will move down the ramp portion 13(iv) the pucks 28 under the control of belt 36, and then travel along a generally horizontal lower section 13(v) to an item unloading station 13(vi). At item loading station 17, the receptacle 22 is removed from puck 28 with robot device 34. This could be done "on the fly" but is preferably done by holding the puck 28 still using a holding device which can be like the holding device 50 employed at the item receptacle loading station. After item unloading station, the pucks 28, then move again to upwardly sloped ramp portion 13(i) and repeat thereafter the process.

The invention claimed is:

1. A system for loading a plurality of items in series into a receptacle held in an item holding device, comprising:
  (a) a plurality of item holding devices each adapted for holding an item receptacle, each item receptacle being adapted to receive and hold a plurality of items;
  (b) a holding device moving apparatus for moving said plurality of item holding devices to and through an item loading station with said item receptacles being oriented at a first angle to the horizontal during loading of a plurality of items;
  (c) an item delivery apparatus delivering to an item loading station, a plurality of items separately in series at an item orientation that is at a second angle to said item receptacles when each item receptacle is at said item loading station, said item delivery apparatus directing items towards each item receptacle in turn held in a holding device at said item orientation;
  wherein said holding device moving apparatus comprises:
    (a) an item holding device conveyor having a conveyor path for moving said plurality of holding devices to an item loading station; (b) an indexing intermittent movement apparatus for moving each of said plurality of item holding devices at said first angle with indexed intermittent movement to allow said plurality of items to be loaded sequentially into each said item receptacle; and
  wherein each item of said plurality of items is delivered in series by said item delivery apparatus towards each item receptacle held in a holding device, and each said holding device is moved with indexed intermittent movement through said item loading station to permit a plurality of items to be sequentially loaded into each said item receptacle.

2. A system as claimed in claim 1 wherein said item holding devices and said item receptacles are both oriented at said first angle to the horizontal.

3. A system as claimed in claim 2 wherein said first angle is in the range of about between 20 to 40 degrees to horizontal.

4. A system as claimed in claim 3 wherein said second angle is about 90 degrees.

5. A system as claimed in claim 2 further comprising an energy absorption member, positioned to be impacted by said items discharged toward said item holding device.

6. A system as claimed in claim 2 wherein each of said item holding devices comprises a puck movable along said conveyor path.

7. A system as claimed in claim 6 further comprising an item receptacle loading station at which said item receptacle is loaded into said puck, prior to moving along said conveyor path to said item loading station.

8. A system as claimed in claim 2 wherein said item delivery apparatus comprises an input conveyor delivering items in series to a metering device, said metering device dispensing items to an output conveyor that feeds said items to a guide mechanism that directs items towards said holding device at said item orientation.

9. A system as claimed in claim 8 further comprising an item receptacle dispenser disposed upstream from said item loading station, said item receptacle dispenser having a magazine containing a plurality of item receptacles, said item receptacle dispenser adapted for dispensing an item receptacle successively into each item holding device and wherein said holding device moving apparatus is operable to move said plurality of item holding devices to and through a receptacle loading station at which said item receptacles are loaded into said item holding devices by said item receptacle dispenser, prior to moving said item holding devices to said item loading station.

10. A system as claimed in claim 8 wherein said metering device comprises a wheel member having a plurality of generally radially extending, generally equally spaced finger members, with all adjacent finger members being configured at a distance there between proximate end portions of said adjacent finger members, for holding at least one item there between.

11. A system as claimed in claim 10 wherein said fingers are radially adjustable in order to vary said distance between end portions of adjacent fingers.

12. A system as claimed in claim 10 wherein said wheel member comprises a first member mounted for rotation relative to a second member, said first member having a plurality of cam tracks associated therewith, said second member configured to support said finger members for adjustable radial movement, said finger members each having associated therewith a cam follower which is received in one of said cam track of said first member, such that rotation of said first member relative to said second member, causes an adjustment in the radial extension of each said finger member, to vary said distance.

13. A system as claimed in claim 1 wherein said indexing intermittent movement apparatus comprises a rotatable gear wheel, having teeth adapted for engaging a longitudinally extending gear mesh on said item holding device, such that rotation of said gear wheel is translated into longitudinal movement of said item holding device, the movement of said gear wheel being controlled by a control device.

14. A system as claimed in claim 1 wherein said an item delivery apparatus comprises a chute oriented substantially at said item orientation to guide said items towards said item holding devices located at said item loading station.

15. A system as claimed in claim 14 further comprising an energy absorption member, positioned to be impacted by said items discharged from said chute toward said item holding devices located at said item loading station.

16. A system as claimed in claim 15 further comprising a resilient spring member, said spring member movable from (a) a resting position to (b) a displaced position when impacted by an item discharged from said chute toward said item holding device to (c) a item loading position wherein said spring moves said item to a position where it can be more readily be received by said item holding device.

17. A system as claimed in claim 16 wherein an item is guided into said item receptacle with the assistance of a previously loaded item in said item receptacle.

18. A system as claimed in claim 1 further comprising an energy absorption member, positioned to be impacted by said items discharged toward said item holding device.

19. A system as claimed in claim 1 wherein said item receptacle is a tray receptacle having a plurality of spaced transverse slots, and wherein each of said items has a lower edge portion receivable in said slots.

20. A system as claimed in claim 19 wherein said items are blister packages containing at least one product.

21. A system as claimed in claim 1 wherein said item receptacle is a tray receptacle having a plurality of spaced transverse slots, and wherein said items have a lower edge portion receivable in said slots.

22. A system as claimed in claim 12 wherein said items are blister packages containing at least one product.

23. A system as claimed in claim 1 further comprising a resilient spring member, said spring member movable from (a) resting position to (b) a displaced position when impacted by an item discharged toward said item holding device to (c) a item loading position wherein said spring moves said item to a position where it can be more readily be received by said item holding device.

24. A system as claimed in claim 1 wherein an item is guided into said item receptacle with the assistance of a previously loaded item already loaded into said item receptacle.

25. A system as claimed in claim 1 wherein said item delivery apparatus further comprises an input apparatus, a wheel member and an output apparatus, said wheel member having a plurality of generally radially extending, generally equally spaced, finger members, with all adjacent finger members being configured at a distance there between proximate end portions of said adjacent finger members, for holding at least one item there between.

26. A system as claimed in claim 25 wherein said fingers are radially adjustable in order to vary said distance between end portions of adjacent fingers.

27. A system as claimed in claim 25 wherein said wheel member comprises a first member mounted for rotation relative to a second member, said first member having a plurality of cam tracks associated therewith, said second member configured to support said finger members for adjustable radial movement, said finger members each having associated therewith a cam follower received in one of said cam tracks, such that rotation of said first member relative to said second member, causes an adjustment in the extension of each said finger member, to vary said distance.

28. A system as claimed in 25 wherein said wheel member is rotatably driven by a motor for intermittent rotation movement.

29. A system as claimed in claim 28 wherein said motor is controlled by a controller device.

30. A system for loading a plurality of items in series into an item receptacle held in an item holding device, said system comprising:
- (a) a plurality of item holding devices each adapted for holding an item receptacle adapted to receive and hold a plurality of items;
- (b) a holding device moving apparatus for moving said plurality of item holding devices through an item loading station with said item receptacles;
- (c) an item delivery apparatus delivering a plurality of items to said item loading station, said item delivery apparatus delivering a plurality of items in series towards an item holding device of said plurality of item holding devices;
- (d) an energy absorption member being separated from said plurality of item holding devices, said energy absorption member being positioned to be impacted by said items delivered toward said item holding device when positioned at said item loading station and said energy absorption member being positioned opposite to a loaded item when a loaded item is held in the item receptacle;
- wherein each item is delivered by said item delivery apparatus toward said item holding device in such a manner that it impacts said energy absorption member which assists in loading said item receptacle with each item, and wherein after impacting said energy absorption member, at least one item is guided between a previously loaded item held in the receptacle and the enemy absorption member, and into said item receptacle.

31. A system as claimed in claim 30 further comprising a resilient spring member, said spring member movable from (a) a resting position to (b) a displaced position when impacted by an item discharged by said item delivery apparatus toward said item holding device to (c) a item loading position wherein said spring moves said item to a position where it can be more readily be received by said item holding device.

32. A system for loading a plurality of items in series into a receptacle held in an item holding device, said system comprising:
- (a) a plurality of item holding devices each adapted for holding an item receptacle adapted to receive and hold at least one item;
- (b) a holding device moving apparatus for moving said plurality of item holding devices to and through an item loading station with said item receptacles;
- (c) an item delivery apparatus delivering a plurality of items in series to said item loading station, said item delivery apparatus directing items towards an item holding device located at said loading station;
- (d) a resilient spring member, said spring member movable from (a) a resting position to (b) a displaced position when impacted by an item discharged by said item delivery apparatus toward said item holding device to (c) a item loading position wherein said spring moves said item to a position where it can be more readily be received by said item holding device;
- wherein each item is delivered by said item delivery apparatus toward said holding device in such a manner that it impacts said spring member which assists in loading said receptacle with said item.

33. A system for loading a plurality of items in series into a receptacle held in a puck, comprising:
- (a) a plurality of pucks each adapted for holding an item receptacle adapted to receive and hold a plurality of items, each of said plurality of pucks having a surface for frictionally engaging a surface of a drive belt conveyor;
- (b) a continuous drive belt conveyor for frictionally engaging said surface of each of said plurality of pucks to move said plurality of pucks in series to an item loading station;
- (c) a movement apparatus at said item loading station adapted for receiving pucks from said belt conveyor, said movement apparatus adapted for co-operation with each of said pucks in series to provide for movement by engagement of at least one protrusion in at least one slot, thereby moving each of said pucks with intermittent movement through said item loading station with said item receptacles being oriented at a first angle to the horizontal;
- (d) an item delivery apparatus delivering to an item loading station, a plurality of items in series at an item orientation that is at a second angle to said item receptacles when each receptacle is at said item loading station, said item delivery apparatus directing items towards each receptacle in turn held in a puck at said item orientation;
- wherein each item of said plurality of items is delivered in series by said item delivery apparatus towards each receptacle held in a puck, and each said puck is moved through said item loading station to permit a plurality of items to be loaded into each said receptacle.

34. A system as claimed in claim 2 wherein said at least one protrusion and at least one slot comprise a gear mechanism that comprises a gear wheel and a mesh longitudinally oriented on each said puck.

35. A system for loading a plurality of items in series into a receptacle held in an item holding device, comprising:
- (a) a plurality of item holding devices each adapted for holding an item receptacle, each item receptacle being adapted to be loaded with a plurality of items;
- (b) a holding device moving apparatus for moving said plurality of item holding devices through an item loading station with said item receptacles being oriented at a first angle to the horizontal during loading of a plurality of items;
- (c) an item delivery apparatus delivering a plurality of items separately in series at an item orientation that is at a second angle to said item receptacles when each item receptacle is being loaded, said item delivery apparatus delivering a plurality of items to item receptacles as said item holding device is held in a holding device at said item orientation;
- wherein said holding device moving apparatus comprises an indexing intermittent movement apparatus for moving each of said plurality of item holding devices at said first angle with indexed intermittent movement to allow said plurality of items to be loaded sequentially into each said item receptacle;
- and wherein a plurality of items is delivered in series by said item delivery apparatus to each item receptacle held in a holding device, and each said holding device is moved with indexed intermittent movement through said item loading station to permit a plurality of items to be sequentially loaded into each said item receptacle.

36. A system as claimed in claim 35 wherein said first angle is in the range of about between 20 to 40 degrees to horizontal.

* * * * *

UNITED STATES PATENT AND TRADEMARK OFFICE
CERTIFICATE OF CORRECTION

PATENT NO. : 7,587,879 B2  Page 1 of 1
APPLICATION NO. : 11/129391
DATED : September 15, 2009
INVENTOR(S) : Peter Guttinger, André A. Weclawski and Petar Baclija It is certified that error appears in the above-identified patent and that said Letters Patent is hereby corrected as shown below:

Column 17
Claim 30, line 29, replace "and the enemy" with -- and the energy --

Column 18
Claim 34, line 29, replace "as claimed in claim 2" with -- as claimed in claim 33 --

Signed and Sealed this

Twentieth Day of April, 2010

David J. Kappos
*Director of the United States Patent and Trademark Office*